United States Patent
Brehmer et al.

(10) Patent No.: US 12,481,877 B2
(45) Date of Patent: Nov. 25, 2025

(54) INSTANCE-ADAPTIVE IMAGE AND VIDEO COMPRESSION IN A NETWORK PARAMETER SUBSPACE USING MACHINE LEARNING SYSTEMS

(71) Applicant: QUALCOMM Incorporated, San Diego, CA (US)

(72) Inventors: Johann Hinrich Brehmer, Amsterdam (NL); Ties Jehan Van Rozendaal, Amsterdam (NL); Yunfan Zhang, Amsterdam (NL); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 17/411,936

(22) Filed: Aug. 25, 2021

(65) Prior Publication Data

US 2023/0074979 A1   Mar. 9, 2023

(51) Int. Cl.
  *G06N 3/08*   (2023.01)
  *G06F 18/211*   (2023.01)

(52) U.S. Cl.
  CPC ............. *G06N 3/08* (2013.01); *G06F 18/211* (2023.01)

(58) Field of Classification Search
  CPC ........... G06T 9/002; G06N 3/045; G06N 3/08
  See application file for complete search history.

(56) References Cited

U.S. PATENT DOCUMENTS

2005/0265618 A1* 12/2005 Jebara ................ G06T 9/00
                                                  382/243
2020/0311551 A1   10/2020 Aytekin et al.

FOREIGN PATENT DOCUMENTS

EP         3716158 A2 *  9/2020  ............. G06N 20/10

OTHER PUBLICATIONS

Yang, Fei, et al. "Slimmable compressive autoencoders for practical neural image compression." Proceedings of the IEEE/CVF Conference on Computer Vision and Pattern Recognition. 2021. (Year: 2021).*
Yu, Jiahui, et al. "Slimmable neural networks." arXiv preprint arXiv:1812.08928 (2018). (Year: 2018).*
Habibian, Amirhossein, et al. "Video compression with rate-distortion autoencoders." Proceedings of the IEEE/CVF international conference on computer vision. 2019.) (Year: 2019).*
(Continued)

*Primary Examiner* — Schyler S Sanks
(74) *Attorney, Agent, or Firm* — QUALCOMM Incorporated

(57) ABSTRACT

Techniques are described for compressing data using machine learning systems. An example process can include receiving input data for compression by a neural network compression system. The process can include determining, based on the input data, a set of updated model parameters for the neural network compression system, wherein the set of updated model parameters is selected from a subspace of model parameters. The process can include generating at least one bitstream including a compressed version of the input data and a compressed version of one or more subspace coordinates that correspond to the set of updated model parameters. The process can include outputting the at least one bitstream for transmission to a receiver.

30 Claims, 17 Drawing Sheets

(56) References Cited

OTHER PUBLICATIONS

Gusak J., et al., "One Time is Not Enough: Iterative Tensor Decomposition for Neural Network Compression", arxiv.org, Cornell University Library, 201 Olin Library Cornell University, Ithaca, NY, 14853, Mar. 24, 2019 (Mar. 24, 2019), 9 Pages, XP081157287, section 2, figure 1.
International Search Report and Written Opinion—PCT/US2022/074440—ISA/EPO—Nov. 25, 2022.
Zou N., et al., "Learning to Learn to Compress", arxiv.org, Cornell University Library, 201 Olin Library Cornell University Ithaca, NY, 14853, May 1, 2021 (May 1, 2021), 6 Pages, XP081950101, sections I, III, figure 1.

* cited by examiner

INSTANCE-ADAPTIVE IMAGE AND VIDEO COMPRESSION IN A NETWORK PARAMETER SUBSPACE USING MACHINE LEARNING SYSTEMS

TECHNICAL FIELD

The present disclosure generally relates to data compression. For example, aspects of the present disclosure include using machine learning systems to compress image and/or video content.

BACKGROUND

Many devices and systems allow image/video data to be processed and output for consumption. Digital image/video data includes large amounts of data to meet increasing demands in image/video quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some examples, systems and techniques are described for data compression and/or decompression using one or more machine learning systems. In some examples, machine learning systems (e.g., using one or more neural network systems) are provided for compressing and/or decompressing image/video data. According to at least one illustrative example, a method of processing image data is provided. The method may include: receiving input data for compression by a neural network compression system; determining, based on the input data, a set of updated model parameters for the neural network compression system, wherein the set of updated model parameters is selected from a subspace of model parameters; generating at least one bitstream including a compressed version of the input data and a compressed version of one or more subspace coordinates that correspond to the set of updated model parameters; and outputting the at least one bitstream for transmission to a receiver.

In another example, an apparatus for processing image data is provided that includes at least one memory and at least one processor (e.g., configured in circuitry) communicatively coupled to the at least one memory. The at least one processor may be configured to: receive input data for compression by a neural network compression system; determine, based on the input data, a set of updated model parameters for the neural network compression system, wherein the set of updated model parameters is selected from a subspace of model parameters; generate at least one bitstream including a compressed version of the input data and a compressed version of one or more subspace coordinates that correspond to the set of updated model parameters; and output the at least one bitstream for transmission to a receiver.

In another example, a non-transitory computer-readable medium is provided that includes stored thereon at least one instruction that, when executed by one or more processors, may cause the one or more processors to: receive input data for compression by a neural network compression system; determine, based on the input data, a set of updated model parameters for the neural network compression system, wherein the set of updated model parameters is selected from a subspace of model parameters; generate at least one bitstream including a compressed version of the input data and a compressed version of one or more subspace coordinates that correspond to the set of updated model parameters; and output the at least one bitstream for transmission to a receiver.

In another example, an apparatus for processing image data is provided. The apparatus may include: means for receiving input data for compression by a neural network compression system; means for determining, based on the input data, a set of updated model parameters for the neural network compression system, wherein the set of updated model parameters is selected from a subspace of model parameters; means for generating at least one bitstream including a compressed version of the input data and a compressed version of one or more subspace coordinates that correspond to the set of updated model parameters; and means for outputting the at least one bitstream for transmission to a receiver.

In another example, a method for processing image data is provided. The method may include: receiving a compressed version of input data and a compressed version of one or more subspace coordinates; determining, based on the one or more subspace coordinates, a set of updated model parameters for a neural network compression system; and processing the input data using the set of updated model parameters to yield a reconstructed version of the input data.

In another example, an apparatus for processing image data is provided that includes at least one memory and at least one processor (e.g., configured in circuitry) communicatively coupled to the at least one memory. The at least one processor may be configured to: receive a compressed version of input data and a compressed version of one or more subspace coordinates; determine, based on the one or more subspace coordinates, a set of updated model parameters for a neural network compression system; and process the input data using the set of updated model parameters to yield a reconstructed version of the input data.

In another example, a non-transitory computer-readable medium is provided that includes stored thereon at least one instruction that, when executed by one or more processors, may cause the one or more processors to: receive a compressed version of input data and a compressed version of one or more subspace coordinates; determine, based on the one or more subspace coordinates, a set of updated model parameters for a neural network compression system; and process the input data using the set of updated model parameters to yield a reconstructed version of the input data.

In another example, an apparatus for processing image data is provided. The apparatus may include: means for receiving a compressed version of input data and a compressed version of one or more subspace coordinates; means for determining, based on the one or more subspace coordinates, a set of updated model parameters for a neural network compression system; and means for processing the input data using the set of updated model parameters to yield a reconstructed version of the input data.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
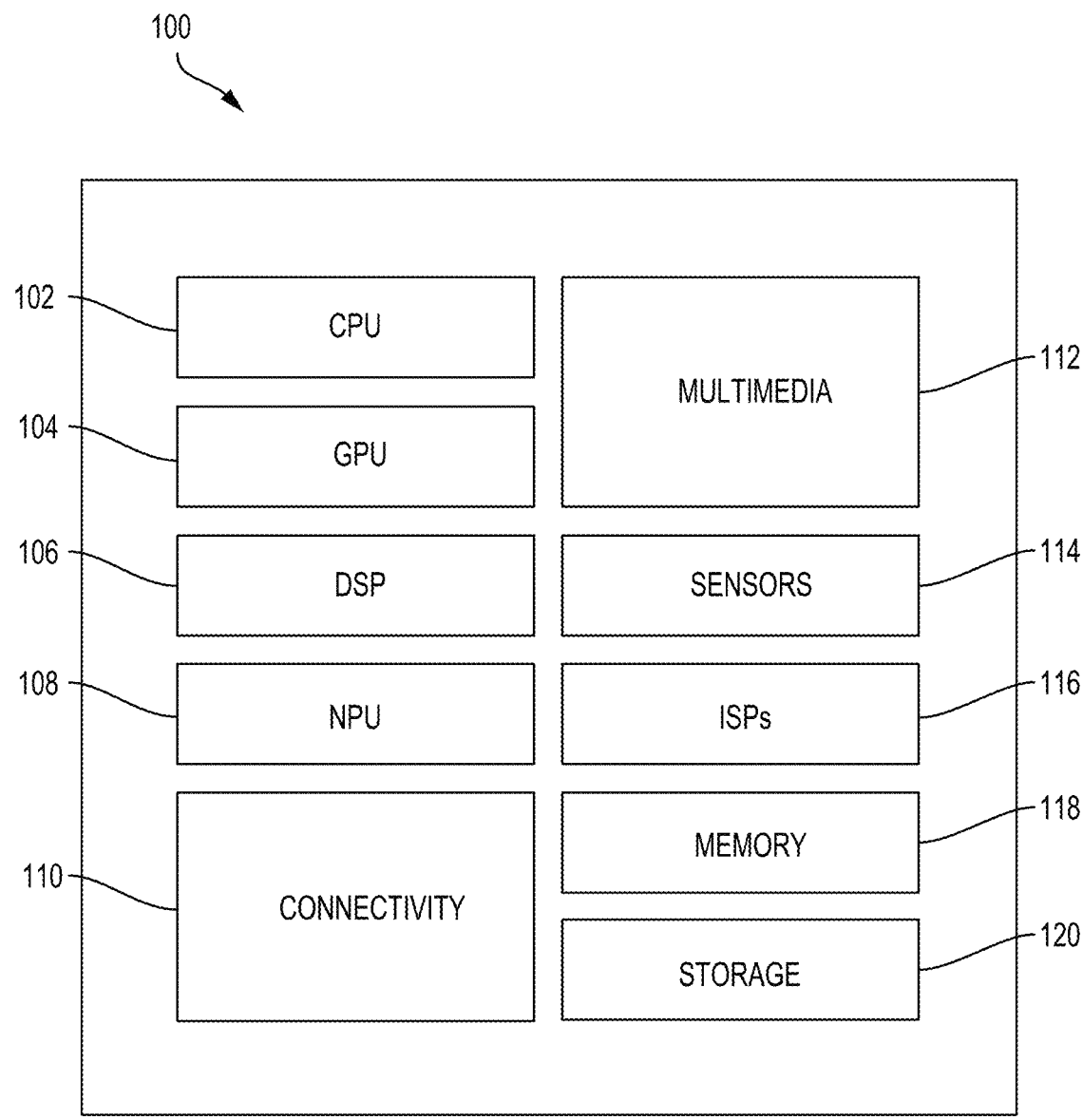
FIG. 1 is a diagram illustrating an example of an image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the scope of the application as set forth in the appended claims.

As noted above, digital image and video data can include large amounts of data, particularly as the demand for high quality video data continues to grow. For example, consumers of image and video data typically desire increasingly high video quality, such as high fidelity, resolution, frame rates, and the like. However, the large amount of data needed to meet such demands can place a significant burden on communication networks, such as high bandwidth and network resource requirements, and on devices that process and store the video data.

Because uncompressed image and video content can result in large files that may involve sizable memory for physical storage and considerable bandwidth for transmission, techniques may be utilized to compress such image and/or video content. For instance, to reduce the size of image content—and thus the amount of storage involved to store image content and the amount of bandwidth involved in delivering video content—various compression algorithms (also referred to as coding algorithms or tools) may be applied to image and video content.

In some cases, image content can be compressed using a priori defined compression algorithms, such as Joint Photographic Experts Group (JPEG), Better Portable Graphics (BPG), among others. JPEG, for example, is a lossy form of compression that is based on the discrete cosine transform (DCT). For instance, a device performing JPEG compression of an image can transform the image into an optimal color space (e.g., a YCbCr color space, including luminance (Y), chrominance-blue (Cb), chrominance-red (Cr)), can downsample the chrominance components by averaging groups of pixels together, and can apply a DCT function to blocks of pixels to remove redundant image data and thus compress the image data. The compression is based on identification of similar regions inside of the image and converting the regions to a same color code (based on the DCT function). Video content can also be compressed using a priori defined compression algorithms, such as the Motion Picture Experts Group (MPEG) algorithms, H.264, or the High Efficiency Video Coding algorithm.

These a priori defined compression algorithms may be able to retain the majority of the information in raw image and video content, and may be defined a priori based on signal processing and information theory ideas. However, while these predefined compression algorithms may be applicable generally (e.g., to any type of image/video content), the compression algorithms may not take into account similarities in content, new resolutions or frame rates for video capture and delivery, non-natural imagery (e.g., radar imagery or other imagery captured via various sensors), and the like.

The a priori defined compression algorithms are considered lossy compression algorithms. In lossy compression of an input image (or video frame), the input image cannot be coded and then decoded/reconstructed so that the exact input image is reconstructed. Rather, in lossy compression, an approximate version of the input image is generated after decoding/reconstruction of the compressed input image. Lossy compression results in a reduction in bitrate, at the cost of distortion which results in artifacts being present in the reconstructed image. Therefore, there is a rate-distortion trade-off in lossy compression systems. For certain compression methods (e.g., JPEG, BPG, among others), the distortion-based artifacts can take the form of blocking or other artifacts.

In some cases, machine learning systems can be used to perform compression and decompression of image and/or video data. For instance, a deep neural network such as a rate-distortion autoencoder (RD-AE) can be used to perform compression and decompression of content (e.g., image content, video content, audio content, etc.). The deep neural network can include an autoencoder (AE) that maps images into a latent code space (e.g., including a set of codes z). In some cases, the deep neural network can also include a probabilistic model (also referred to as a prior or code model) that can losslessly compress the codes z from the latent code space. The probabilistic model can generate a probability distribution over the set of codes z that can represent encoded data based on the input data.

Machine learning based compression techniques (e.g., RD-AE) can be used to generate compressed content having a high quality and/or reduced bitrate. In some examples, an RD-AE can be trained to minimize the average rate-distortion loss over a dataset of datapoints, such as image and/or video datapoints. In some cases, the RD-AE can also be fine-tuned for a particular datapoint to be sent to and decoded by a receiver. In some examples, by fine-tuning the RD-AE on a datapoint, the RD-AE can obtain a high compression (Rate/Distortion) performance. An encoder associated with the RD-AE can send the AE model or part of the AE model to a receiver (e.g., a decoder) to decode the bitstream.

While machine learning based compression systems can perform better than lossy compression systems, implementation of such machine learning based compressions systems presents certain drawbacks. For example, neural compression algorithms require large neural networks that can result in increased computational and/or memory requirements. In addition, the optimal settings (e.g., weights) that are used in a deep neural network depend on the training dataset and may not perform well when used with different data. For instance, neural video codecs that are trained on natural scenes may not perform well on animated scenes. Furthermore, while certain neural networks can be fine-tuned based on each instance, the transmission of the updated, fine-tuned parameters to the decoder can cause a substantial increase in the file size and/or bitrate.

In some aspects, systems, apparatuses, processes (also referred to as methods), and computer-readable media (collectively referred to herein as "systems and techniques") are described herein for performing data (e.g., image, video, audio, etc.) compression and decompression (also referred to as encoding and decoding, collectively referred to as coding) using one or more machine learning systems. In some examples, the machine learning techniques can provide image and/or video compression that produces high quality visual outputs.

In some aspects, a machine learning system (e.g., a neural network such as a rate-distortion autoencoder (RD-AE) or other neural network) can be trained to minimize the average rate-distortion loss over a dataset of data points, such as image and/or video data points. In some examples, a set of global model parameters (e.g., weights) can be associated with the trained machine learning system. In some cases, training of the machine learning system can include identifying parameters (e.g., a weight vector) that are associated with each iteration of training. For example, a weight vector can correspond to each training iteration and the global model parameters can correspond to the weight vector for the trained neural network.

In some examples, training of the machine learning system can include determining a subspace or manifold of model parameters having a lower dimension than the full parameter space. In some aspects, the subspace or manifold of model parameters includes a portion of the weight vectors associated with each iteration of training. In some cases, the subspace or manifold of model parameters can be determined using Principal Component Analysis (PCA). For example, PCA can be used to identify one or more directions and/or trajectories in the full parameter space in which model parameters performed well during training of the neural network (e.g., when the result of a loss function is below a threshold value). In some aspects, a sparse PCA can be used to reduce the size of the subspace of model parameters. In some examples, the subspace or manifold of model parameters can be shared with a neural network that is configured to decode the encoded data.

In some examples, the machine learning system can be fine-tuned (e.g., trained, fitted, etc.) for an instance of input data (e.g., an image, a video, a portion of a video, three-dimensional (3D) data, etc.) that is to be compressed and transmitted to a receiving device that includes a decoder. In some aspects, fine-tuning the machine learning system can be performed using the subspace or manifold of model parameters. For example, fine-tuning of the neural network can include selecting a set of updated model parameters that correspond to a weight vector that is part of the subspace or manifold of model parameters (e.g., selecting an optimal weight vector for the instance). In some cases, the set of updated parameters (e.g., the weight vector selected during fine-tuning) can be associated with one or more subspace coordinates. In one example, the one or more subspace coordinates can be relative to the set of global parameters (e.g., the subspace coordinates can correspond to a trajectory that is relative to the set of global parameters).

In some aspects, the set of updated parameters can be used to encode the input data. In some examples, the machine learning system (e.g., a neural network such as a RD-AE or other neural network) can further include an arithmetic coder (e.g., including an arithmetic encoder, an arithmetic decoder, or a combined arithmetic encoder-decoder). The arithmetic coder (e.g., an arithmetic encoder or a combined arithmetic encoder-decoder) can generate a bitstream including a compressed version of the input data. In some cases, the bitstream can also include a compressed version of the one or more subspace coordinates that correspond to the set of updated model parameters. In some cases, the receiving device can receive the bitstream. The decoder of the receiving device can use the one or more subspace coordinates to determine the updated model parameters for the neural network. A machine learning system (e.g., a neural network, such as an RD-AE or other neural network) of the decoder can use the updated model parameters to decode the compressed input data.

In some aspects, the systems and techniques disclosed herein can be used to improve compression performance by adapting the machine learning system (e.g., a neural network) to each data instance. In some examples, the systems and techniques disclosed herein can reduce the bitrate and/or file size for sending network parameter updates (e.g., fine-tuning neural network) to a decoder by selecting the fine-tuned weight vectors from a lower-dimensional subspace.

The one or more machine learning systems can be trained as described herein and used to perform data compression and/or decompression, such as image, video, and/or audio compression and decompression. The machine learning systems described herein can be trained to perform compression/decompression techniques that produce high quality data outputs. The systems and techniques described herein can perform compression and/or decompression of any type of data. For example, in some cases, the systems and techniques described herein can perform compression and/or decompression of image data. As another example, in some cases, the systems and techniques described herein can perform compression and/or decompression of video data. As used herein, the term "image" and "frame" are used interchangeably, referring to a standalone image or frame (e.g., a photograph) or a group or sequence of images or frames (e.g., making up a video or other sequence of images/frames). As another example, in some cases, the systems and techniques described herein can perform compression and/or decompression of audio data. For simplicity, illustration and explanation purposes, the systems and techniques described herein are discussed with reference to compression and/or decompression of image data (e.g., images or frames, videos, etc.). However, as noted above, the concepts described herein can also apply to other modalities such as audio data and any other type of data.

A compression model used by an encoder and/or decoder can be generalizable to different types of data. Moreover, by utilizing an instance-adaptive neural model with various characteristics described herein, the machine learning system can increase the compression and/or decompression performance, bitrate, quality, and/or efficiency for a particular set of data. For instance, the instance-adaptive neural model based machine learning system can reduce the bitrate by fine-tuning the neural network within a predefined subspace of network parameters and providing a parameter update within the subspace to the decoder.

As noted above, in some examples, the machine learning system can include one or more neural networks. Machine learning (ML) is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as deep generative neural network models (e.g., generative adversarial network (GANs)), recurrent neural network (RNN) models, multilayer perceptron (MLP) neural network models, convolutional neural network (CNN) models, autoencoders (AEs), among others. For example, a GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as $G(z)$) generates a synthesized output, and the other neural network (referred to as an discriminative neural network or discriminator denoted as $D(X)$) evaluates the output for authenticity (whether the output is from an original dataset, such as the training dataset, or is generated by the generator). The training input and output can include images as an illustrative example. The generator is trained to try and fool the discriminator into determining a synthesized image generated by the generator is a real image from the dataset. The training process continues and the generator becomes better at generating the synthetic images that look like real images. The discriminator continues to find flaws in the synthesized images, and the generator figures out what the discriminator is looking at to determine the flaws in the images. Once the network is trained, the generator is able to produce realistic looking images that the discriminator is unable to distinguish from the real images.

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

An autoencoder (AE) can learn efficient data codings in an unsupervised manner. In some examples, an AE can learn a representation (e.g., data coding) for a set of data by training the network to ignore signal noise. An AE can include an encoder and a decoder. The encoder can map input data into code and the decoder can map the code to a reconstruction of the input data. In some examples, a rate-distortion autoencoder (RD-AE) can be trained to minimize the average rate-distortion loss over a dataset of datapoints such as image and/or video datapoints. In some cases, the RD-AE can do a forward pass at inference time to encode a new datapoint.

FIG. 1 is a diagram illustrating an example of an image processing system 100 in accordance with some examples of the present disclosure. In some cases, the image processing system 100 can include a central processing unit (CPU) 102 or a multi-core CPU configured to perform one or more of the functions described herein. Variables (e.g., neural signals and synaptic weights), system parameters associated with a computational device (e.g., a neural network with weights), delays, frequency bin information, task information, among other information, may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or distributed across multiple blocks. Instructions executed at the CPU 102 may be loaded from a program memory associated with the CPU 102 and/or a memory block 118.

The image processing system 100 may include additional processing blocks tailored to specific functions, such as a GPU 104; a DSP 106; a connectivity block 110 which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect and recognize features. In one implementation, the NPU 108 is implemented in the CPU 102, DSP 106, and/or GPU 104. The image processing system 100 may also include a sensor processor 114, one or more image signal processors (ISPs) 116, and/or a storage 120. In some examples, the image processing system 100 may be based on an ARM instruction set.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SOC), an Internet-of-Things (IoT) device, or any other suitable electronic device(s).

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 16.

The image processing system 100 and/or components thereof can be configured to perform compression and/or decompression (also referred to as encoding and/or decoding, collectively referred to as image coding) using the machine learning systems and techniques described herein. In some cases, the image processing system 100 and/or components thereof can be configured to perform image or video compression and/or decompression using the techniques described herein. In some examples, the machine learning systems can utilize deep learning neural network architectures to perform compression and/or decompression of image, video, and/or audio data. By using deep learning neural network architectures, the machine learning systems can increase the efficiency and speed of the compression and/or decompression of content on a device. For example, a device using the compression and/or decompression techniques described can compress one or more images efficiently using the machine learning based techniques, can transmit the compressed one or more images to a receiving device, and the receiving device can decompress the one or more compressed images efficiently using the machine learning based techniques described herein. As used herein, an image can refer to a still image and/or a video frame associated with a sequence of frames (e.g., a video).

As noted above, a neural network is an example of a machine learning system. A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
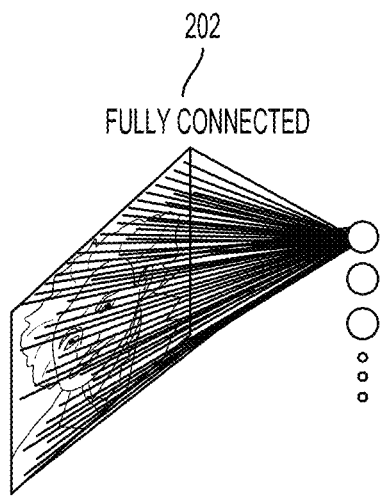
FIG. 2A is a diagram illustrating an example of a fully-connected neural network, in accordance with some examples of the present disclosure.
Figure 2B:
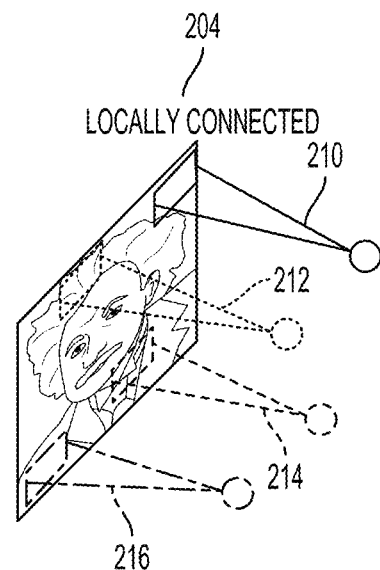
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
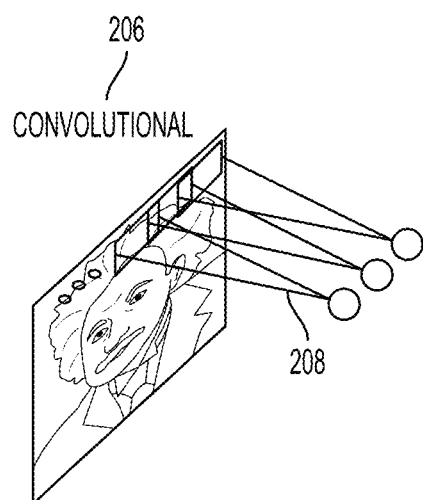
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
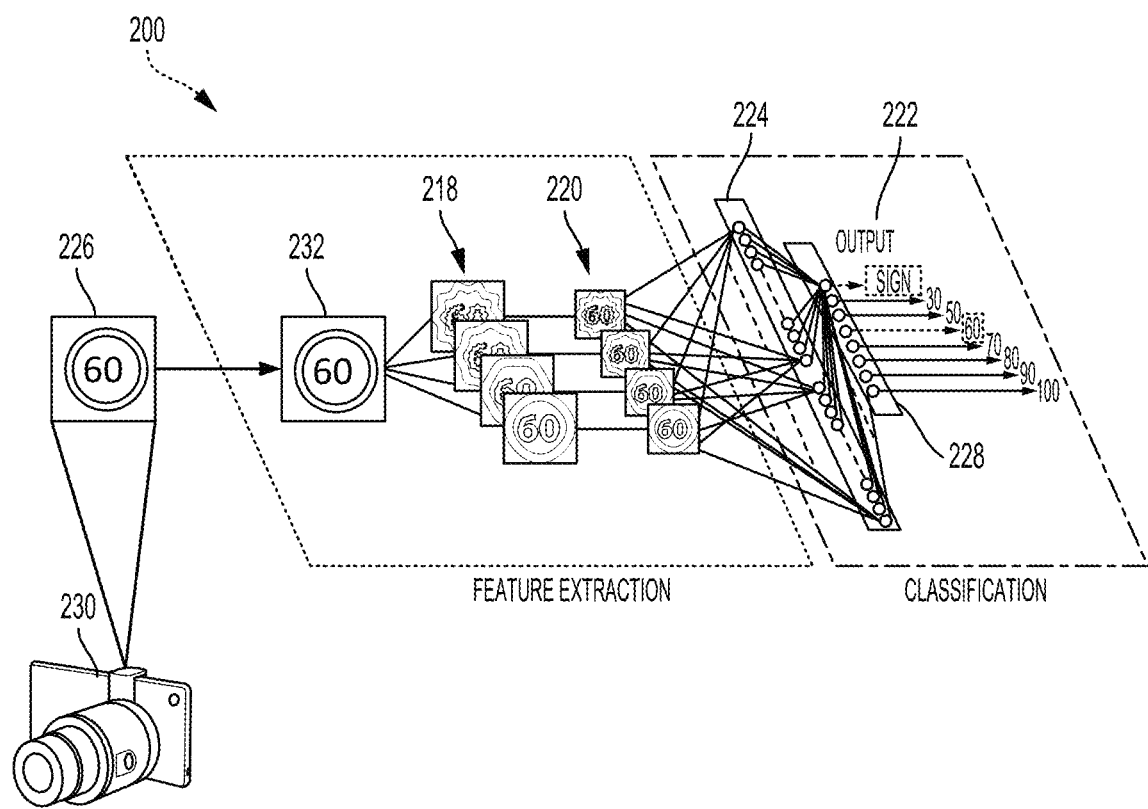
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
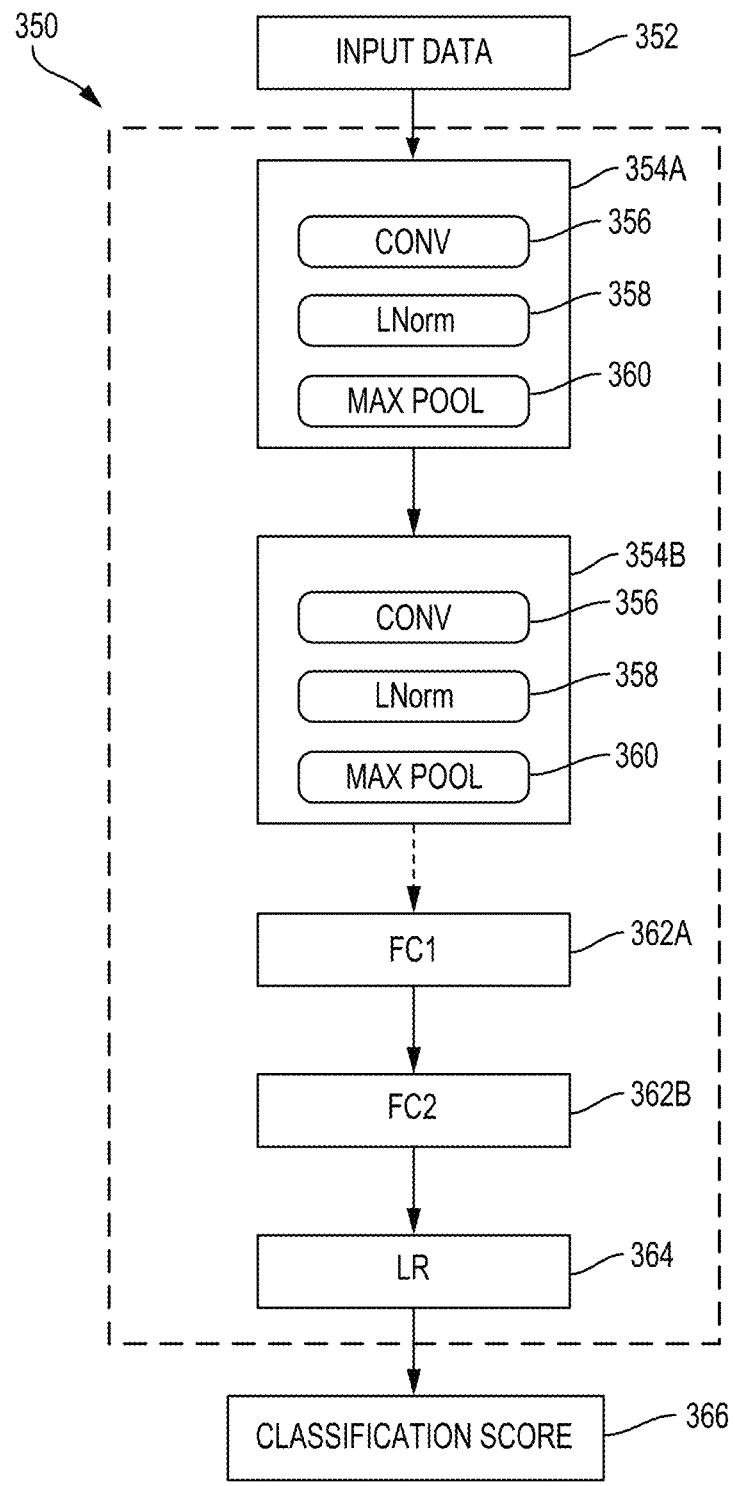
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In alternative embodiments, the parallel filter banks may be loaded on the DSP 106 or an ISP 116 of an image processing system 100. In addition, the deep convolutional network 350 may access other processing blocks that may be present on the image processing system 100, such as sensor processor 114.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Image and video content may be stored and/or may be shared among devices. For instance, image and video content can be uploaded to media hosting services and sharing platforms, and can be transmitted to a variety of devices. Recording uncompressed image and video content generally results in large file sizes that greatly increase as the resolution of the image and video content increases. For example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Because uncompressed image and video content can result in large files that may involve sizable memory for physical storage and considerable bandwidth for transmission, techniques may be utilized to compress such video content. For instance, to reduce the size of image content—and thus the amount of storage involved to store image content and the amount of bandwidth involved in delivering video content—various compression algorithms may be applied to image and video content.

In some cases, image content can be compressed using a priori defined compression algorithms, such as Joint Photographic Experts Group (JPEG), Better Portable Graphics (BPG), among others. JPEG, for example, is a lossy form of compression that is based on the discrete cosine transform (DCT). For instance, a device performing JPEG compression of an image can transform the image into an optimal color space (e.g., a YCbCr color space, including luminance (Y), chrominance-blue (Cb), chrominance-red (Cr)), can downsample the chrominance components by averaging groups of pixels together, and can apply a DCT function to blocks of pixels to remove redundant image data and thus compress the image data. The compression is based on identification of similar regions inside of the image and converting the regions to a same color code (based on the DCT function). Video content can also be compressed using a priori defined compression algorithms, such as the Motion Picture Experts Group (MPEG) algorithms, H.264, or the High Efficiency Video Coding algorithm.

These a priori defined compression algorithms may be able to retain the majority of the information in raw image and video content, and may be defined a priori based on signal processing and information theory ideas. However, while these predefined compression algorithms may be applicable generally (e.g., to any type of image/video content), the compression algorithms may not take into account similarities in content, new resolutions or frame rates for video capture and delivery, non-natural imagery (e.g., radar imagery or other imagery captured via various sensors), and the like.

The a priori defined compression algorithms are considered lossy compression algorithms. In lossy compression of an input image (or video frame), the input image cannot be coded and then decoded/reconstructed so that the exact input image is reconstructed. Rather, in lossy compression, an approximate version of the input image is generated after decoding/reconstruction of the compressed input image. Lossy compression results in a reduction in bitrate, at the cost of distortion which results in artifacts being present in the reconstructed image. Therefore, there is a rate-distortion trade-off in lossy compression systems. For certain compression methods (e.g., JPEG, BPG, among others), the distortion-based artifacts can take the form of blocking or other artifacts. In some cases, neural network based compression can be used and can result in high quality compression of image data and video data. In some cases, blurring and color shift are examples of artifacts.

Whenever the bitrate goes below a true entropy of input data, it may be difficult or impossible to reconstruct the exact input data. However, the fact that there is distortion/loss realized from the compression/decompression of the data does not mean that the reconstructed image or frame does not have to have artifacts. Indeed, it can be possible to reconstruct a compressed image to another similar, but different, image that has high visual quality.

In some cases, compression and decompression can be performed using one or more machine learning (ML) systems. In some examples, such ML based systems can provide image and/or video compression that produces high quality visual outputs. In some examples, such systems can perform compression and decompression of content (e.g., image content, video content, audio content, etc.) using a deep neural network(s) such as a rate-distortion autoencoder (RD-AE). The deep neural network can include an autoencoder (AE) that maps images into a latent code space (e.g., including a set of codes z). The latent code space can include a code space used by an encoder and a decoder, and in which the content has been encoded into the codes z. The codes (e.g., codes z) can also be referred to as latents, latent variables or latent representations. The deep neural network can include a probabilistic model (also referred to as a prior or code model) that can losslessly compress the codes z from the latent code space. The probabilistic model can generate a probability distribution over the set of codes z that can represent encoded data based on the input data. In some cases, the probability distribution can be denoted as (P(z)).

In some examples, the deep neural network may include an arithmetic coder that generates a bitstream including the compressed data to be output based on the probability distribution P(z) and/or the set of codes z. The bitstream including the compressed data can be stored and/or can be transmitted to a receiving device. The receiving device can perform an inverse process to decode or decompress the bitstream using, for example, an arithmetic decoder, a probabilistic (or code) model, and a decoder of an AE. The device that generated the bitstream including the compressed data can also perform a similar decoding/decompression process when retrieving the compressed data from storage. A similar technique can be performed to compress/encode and decompress/decode updated model parameters.

In some examples, an RD-AE can be trained and operated to perform as a multi-rate AE (including high-rate and low-rate operations). For example, the latent code space generated by an encoder of the multi-rate AE can be divided into two or more chunks (e.g., codes z divided into chunks $z_1$ and $z_2$). In a high-rate operation, the multi-rate AE can send a bitstream that is based on the entire latent space (e.g., codes z, including $z_1$, $z_2$, etc.) which can be used by the receiving device to decompress the data, similar to the operations described above with respect to the RD-AE. In the low-rate operation, the bitstream that is sent to the receiving device is based on a subset of the latent space (e.g., the chunk $z_1$ and not $z_2$). The receiving device can infer the remaining portion of the latent space based on the subset that was sent, and can generate a reconstructed data using the subset of the latent space and the inferred remaining portion of the latent space.

By compressing (and decompressing) content using the RD-AE or the multi-rate AE, encoding and decoding mechanisms can be adaptable to various use cases. The machine learning based compression techniques can generate compressed content having a high quality and/or reduced bitrate. In some examples, an RD-AE can be trained to minimize the average rate-distortion loss over a dataset of datapoints, such as image and/or video datapoints. In some cases, the RD-AE can also be fine-tuned for a particular datapoint to be sent to and decoded by a receiver. In some examples, by fine-tuning the RD-AE on a datapoint, the RD-AE can obtain a high compression (Rate/Distortion) performance. An encoder associated with the RD-AE can send the AE model or part of the AE model to a receiver (e.g., a decoder) to decode the bitstream.

In some cases, a neural network compression system can reconstruct an input instance (e.g., an input image, video, audio, etc.) from a (quantized) latent representation. The neural network compression system can also use a prior to losslessly compress the latent representation. In some cases, the neural network compression system can determine a test-time data distribution is known and relatively low entropy (e.g. a camera watching a static scene, a dash cam in an autonomous car, etc.), and can be fine-tuned or adapted to such distribution. The fine-tuning or adaptation can lead to improved rate/distortion (RD) performance. In some examples, a model of the neural network compression system can be adapted to a single input instance to be compressed. The neural network compression system can provide model updates, which in some examples can be quantized and compressed using a parameter-space prior, along with the latent representation.

The fine-tuning can take into account the effect of model quantization and the additional costs incurred by sending model updates. In some examples, the neural network compression system can be fine-tuned using an RD loss as well as an additional model rate term M that measures the number of bits needed to send model updates under a model prior, resulting in a combined RDM loss.

Figure 4:
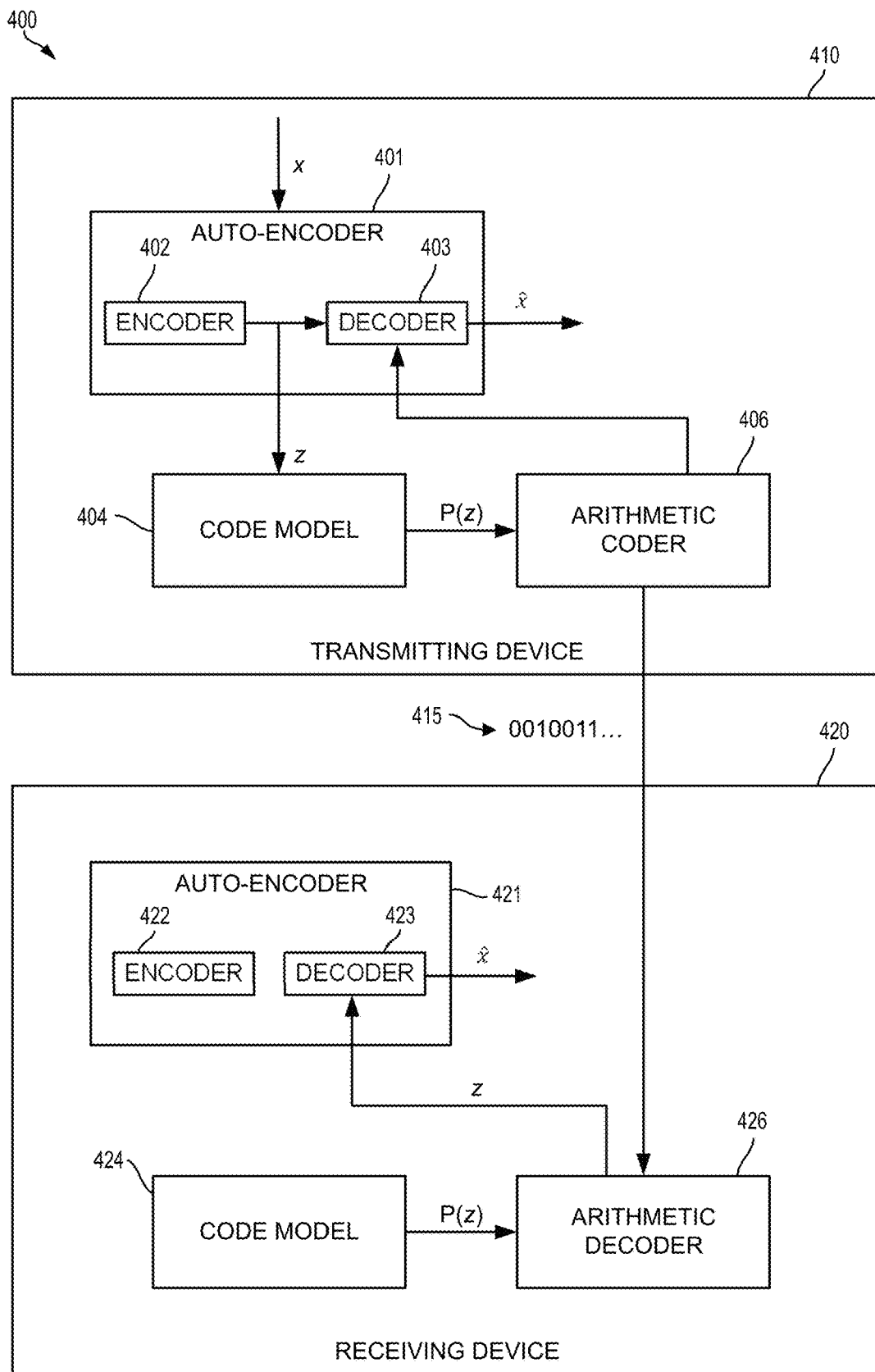
FIG. 4 is a diagram illustrating an example of a system including a transmitting device for compressing video content and a receiving device for decompressing a received bitstream into video content, in accordance with some examples of the present disclosure.

FIG. 4 is a diagram illustrating a system 400 including a transmitting device 410 and a receiving device 420, in accordance with some examples of the present disclosure. The transmitting device 410 and the receiving device 420 can each be referred to in some cases as a RD-AE. The transmitting device 410 can compress image content, and can store the compressed image content and/or transmit the compressed image content to a receiving device 420 for decompression. The receiving device 420 can decompress the compressed image content, and can output the decompressed image content on the receiving device 420 (e.g., for display, editing, etc.) and/or can output the decompressed image content to other devices (e.g., a television, a mobile device, or other device) connected to receiving device 420. In some cases, the receiving device 420 can become a transmitting device by compressing (using encoder 422) image content and storing and/or transmitting the compressed image content to another device, such as the transmitting device 410 (in which case the transmitting device 410 would become a receiving device). While the system 400 is described herein with respect to image compression and decompression, one of skill will appreciate that the system 400 can use the techniques described herein for compressing and decompressing video content.

As illustrated in FIG. 4, the transmitting device 410 includes an image compression pipeline, and the receiving device 420 includes an image bitstream decompression pipeline. The image compression pipeline in the transmitting device 410 and the bitstream decompression pipeline in the receiving device 420 generally use one or more artificial neural networks to compress image content and/or decompress a received bitstream into image content, according to aspects of the present disclosure. The image compression pipeline in the transmitting device 410 includes an autoencoder 401, a code model 404, and an arithmetic coder 406. In some implementations, the arithmetic coder 406 is optional and can be omitted in some cases. The image decompression pipeline in the receiving device 420 includes an autoencoder 421, a code model 424, and an arithmetic decoder 426. In some implementations, the arithmetic decoder 426 is optional and can be omitted in some cases. The autoencoder 401 and the code model 404 of the transmitting device 410 are illustrated in FIG. 4 as a machine learning system that has been previously trained and thus configured for performing operations during inference or operation of the trained machine learning system. The autoencoder 421, the code model 424, and the completion model 425 are also illustrated as a machine learning system that has been previously trained.

The autoencoder 401 includes an encoder 402 and a decoder 403. The encoder 402 can perform lossy compression on received uncompressed image content by mapping pixels in one or more images of the uncompressed image content to a latent code space (including codes z). Generally, encoder 402 may be configured such that the codes z representing a compressed (or encoded) image are discrete or binary. These codes may be generated based on stochastic perturbation techniques, soft vector quantization, or other techniques that can generate distinct codes. In some aspects, autoencoder 401 may map uncompressed images to codes having a compressible (low entropy) distribution. These codes may be close in cross-entropy to a predefined or learned prior distribution.

In some examples, the autoencoder 401 can be implemented using a convolutional architecture. For instance, in some cases, autoencoder 401 can be configured as a two-dimensional convolutional neural network (CNN) such that autoencoder 401 learns spatial filters for mapping image content to the latent code space. In examples in which the system 400 is used for coding video data, the autoencoder 401 can be configured as a three-dimensional CNN such that autoencoder 401 learns spatio-temporal filters for mapping video to a latent code space. In such a network, the autoencoder 401 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, autoencoder 401 may be implemented as a two-dimensional neural network conditioned on previous frames, a residual factor between frames, and conditioning through stacking channels or including recurrent layers.

The encoder 402 of the autoencoder 401 can receive as input a first image (designated in FIG. 4 as image x) and can map the first image x to a code z in a latent code space. As noted above, the encoder 402 can be implemented as a two-dimensional convolutional network such that the latent code space has at each (x, y) position a vector describing a block of the image x centered at that position. The x-coordinate can represent a horizontal pixel location in the block of the image x, and the y-coordinate can represent a vertical pixel location in the block of the image x. When coding video data, the latent code space can have a t variable or position, with the t variable representing a timestamp in a block of video data (in addition to the spatial x- and y-coordinates). By using the two dimensions of the horizontal and vertical pixel positions, the vector can describe an image patch in the image x.

A decoder 403 of the autoencoder 401 can then decompress the code z to obtain a reconstruction $\hat{x}$ of the first image x. Generally, the reconstruction $\hat{x}$ can be an approximation of the uncompressed first image x and need not be an exact copy of the first image x. In some cases, the reconstructed image $\hat{x}$ can be output as a compressed image file for storage in the transmitting device.

The code model 404 receives the code z representing an encoded image or portion thereof and generates a probability distribution P(z) over a set of compressed codewords that can be used to represent the code z. In some examples, the code model 404 can include a probabilistic auto-regressive generative model. In some cases, the codes for which a probability distribution may be generated include a learned distribution that controls bit assignment based on the arithmetic coder 406. For example, using the arithmetic coder 406, a compression code for a first code z can be predicted in isolation; a compression code for a second code z can be predicted based on the compression code for the first code z; a compression code for a third code z can be predicted based on the compression codes for the first code z and the second code z, and so on. The compression codes generally represent different spatio-temporal chunks of a given image to be compressed.

In some aspects, z may be represented as a three-dimensional tensor. The three dimensions of the tensor may include a feature channel dimension, and height and width spatial dimensions (e.g., denoted as code $z_{c,w,h}$). Each code $z_{c,w,h}$ (representing a code indexed by channel and horizontal and vertical position) can be predicted based on a previous code, which can be a fixed and theoretically arbitrary ordering of codes. In some examples, the codes can be generated by analyzing a given image file from start to finish and analyzing each block in the image in a raster scan order.

The code model 404 can learn the probability distribution for an input code z using a probabilistic auto-regressive model. The probability distribution can be conditioned on its previous values (as described above). In some examples, the probability distribution can be represented by the following equation:

$$P(z) = \Pi_{c=0}^{C} \Pi_{w=0}^{W} \Pi_{h=0}^{H} p(z_{c,w,h} | z_{0:c, 0:w, 0:h})$$

where c is a channel index for all image channels C (e.g., the R, G, and B channels, the Y, Cb, and Cr channels, or other channels), w is a width index for a total image frame width W, and h is a height index for a total image frame height H.

In some examples, the probability distribution P(z) can be predicted by a fully convolutional neural network of causal convolutions. In some aspects, the kernels of each layer of the convolutional neural network can be masked such that the convolutional network is aware of previous values $z_{0:c, 0:w, 0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input).

The arithmetic coder 406 uses the probability distribution P(z) generated by the code model 404 to generate a bitstream 415 (shown in FIG. 4 as "0010011 . . . ") corresponding to a prediction of the code z. The prediction of the code z can be represented as the code having a highest probability score in a probability distribution P(z) generated over a set of possible codes. In some aspects, the arithmetic coder 406 can output a bitstream of variable length based on the accuracy of a prediction of code z and the actual code z generated by the autoencoder 401. For example, the bitstream 415 can correspond to a short codeword if the prediction is accurate, whereas the bitstream 415 may correspond to longer codewords as a magnitude of a difference between code z and the prediction of code z increases.

In some cases, the bitstream 415 can be output by arithmetic coder 406 for storage in a compressed image file.

The bitstream 415 can also be output for transmission to a requesting device (e.g., the receiving device 420, as illustrated in FIG. 4). Generally, the bitstream 415 output by the arithmetic coder 406 may losslessly encode z such that z may be accurately recovered during a decompression processes applied on a compressed image file.

The bitstream 415 generated by the arithmetic coder 406 and transmitted from the transmitting device 410 can be received by the receiving device 420. Transmission between the transmitting device 410 and the receiving device 420 can occur using any of various suitable wired or wireless communication technologies. Communication between the transmitting device 410 and the receiving device 420 may be direct or may be performed through one or more network infrastructure components (e.g., base stations, relay stations, mobile stations, network hubs, routers, and/or other network infrastructure components).

As illustrated, the receiving device 420 can include an arithmetic decoder 426, a code model 424, and an autoencoder 421. The autoencoder 421 includes an encoder 422 and a decoder 423. The decoder 423, for a given input, can produce the same or a similar output as the decoder 403. While the autoencoder 421 is illustrated as including the encoder 422, the encoder 422 need not be used during the decoding process to obtain (e.g., an approximation of an original image x that was compressed at the transmitting device 410) from a code z received from the transmitting device 410.

The received bitstream 415 can be input into the arithmetic decoder 426 to obtain one or more codes z from the bitstream. The arithmetic decoder 426 may extract a decompressed code z based on a probability distribution P(z) generated by the code model 424 over a set of possible codes and information associating each generated code z with a bitstream. Given a received portion of the bitstream and a probabilistic prediction of the next code z, the arithmetic decoder 426 can produce a new code z as it was encoded by arithmetic coder 406 at transmitting device 410. Using the new code z, the arithmetic decoder 426 can make a probabilistic prediction for a successive code z, read an additional part of the bitstream, and decode the successive code z until the entire received bitstream is decoded. The decompressed code z may be provided to the decoder 423 in the autoencoder 421. The decoder 423 decompresses the code z and outputs an approximation x̂ (which can be referred to as a reconstructed or decoded image) of the image content x. In some cases, the approximation x̂ of the content x can be stored for later retrieval. In some cases, the approximation x̂ of the content x may be recovered by the receiving device 420 and displayed on a screen communicatively coupled to or integral with the receiving device 420.

As noted above, the autoencoder 401 and the code model 404 of the transmitting device 410 are illustrated in FIG. 4 as a machine learning system that has been previously trained. In some aspects, autoencoder 401 and the code model 404 can be trained together using image data. For instance, the encoder 402 of the autoencoder 401 can receive as input a first training image n and can map the first training image n to a code z in the latent code space. The code model 404 can learn a probability distribution P(z) for the code z using the probabilistic auto-regressive model (similar to the techniques described above). The arithmetic coder 406 can use the probability distribution P(z) generated by the code model 404 to generate an image bitstream. Using the bitstream and the probability distribution P(z) from the code model 404, the arithmetic coder 406 can generate the code z, and can output the code z to the decoder 403 of the autoencoder 401. The decoder 403 can then decompress the code z to obtain a reconstruction n̂ of the first training image n (where the reconstruction n̂, is an approximation of the uncompressed first training image n).

In some cases, a backpropagation engine used during training of the transmitting device 410 can perform a backpropagation process to tune parameters (e.g., weights, biases, etc.) of the neural network of the autoencoder 401 and the code model 404 based on one or more loss functions. In some cases, the backpropagation process can be based on stochastic gradient descent techniques. Backpropagation can include a forward pass, one or more loss functions, a backward pass, and a weight (and/or other parameter(s)) update. The forward pass, loss function, backward pass, and parameter update can be performed for one training iteration. The process can be repeated for a certain number of iterations for each set of training data until the weights and/or other parameters of the neural network are accurately tuned.

For example, the autoencoder 401 can compare n and n̂ to determine a loss (e.g., represented by a distance vector or other difference value) between the first training image n and the reconstructed first training image n̂. The loss function can be used to analyze error in the output. In some examples, the loss can be based on a maximum likelihood. In one illustrative example using an uncompressed image n as input and reconstructed image n̂ as the output, the loss function Loss=D+beta*R can be used to train the neural network system of the autoencoder 401 and code model 404, where R is rate, D is distortion, * denotes a multiplication function, and beta is a tradeoff parameter that is set to a value that defines the bitrate. In another example, the loss function Loss0=$\Sigma_t$ distortion(n, n̂) can be used to train the neural network system of the autoencoder 401 and code model 404. Other loss functions can be used in some cases, such as when other training data is used. One example of another loss function includes a mean squared error (MSE), defined as $E_{total}=\Sigma \frac{1}{2}(target-output)^2$. The MSE calculates the sum of one-half times the actual answer minus the predicted (output) answer squared.

Based on the determined loss (e.g., the distance vector or other difference value) and using the backpropagation process, the parameters (e.g., weights, biases, etc.) of the neural network system of the autoencoder 401 and the code model 404 can be adjusted (effectively adjusting mappings between received image content and the latent code space) to reduce the loss between input uncompressed images and compressed image content generated as output by the autoencoder 401.

The loss (or error) may be high for the first training images, since the actual output values (a reconstructed image) may be much different than the input image. A goal of training is to minimize the amount of loss for the predicted output. The neural network can perform a backward pass by determining which nodes of the neural network (with corresponding weights) most contributed to the loss of the neural network, and can adjust the weights (and/or other parameters) so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network system of the autoencoder 401 and the code model 404 can continue to be trained in such a manner until a desired output is achieved. For example, the autoencoder 401 and code model 404 can repeat the backpropagation process to minimize or otherwise reduce differences between an input image n and a reconstructed image n̂ resulting from decompression of a generated code z.

The autoencoder 421 and the code model 424 can be trained using similar techniques as that described above for training the autoencoder 401 and the code model 404 of the transmitting device 410. In some cases, the autoencoder 421 and the code model 424 can be trained using a same or a different training dataset used to train the autoencoder 401 and the code model 404 of the transmitting device 410.

In the example shown in FIG. 4, the rate-distortion autoencoders (the transmitting device 410 and the receiving device 420) are trained and run at inference according to a bitrate. In some implementations, a rate-distortion autoencoder can be trained at multiple bitrates to allow for generation and output of high quality reconstructed images or video frames (e.g., without or with limited artifacts due to distortion with respect to the input image) when varying amounts of information are provided in the latent codes z.

In some implementations, the latent codes z can be divided into at least two chunks $z_1$ and $z_2$. When the RD-AE model is used at a high-rate setting, both chunks are transmitted to a device for decoding. When the rate-distortion autoencoder model is used in a low-rate setting, only chunk $z_1$ is transmitted and chunk $z_2$ is inferred from $z_1$ on the decoder side. The inference of $z_2$ from $z_1$ can be performed using various techniques, as described in more detail below.

In some implementations, a set of continuous latents (e.g., which can convey a large amount of information) and corresponding quantized discrete latents (e.g., which contain less information) can be used. After training the RD-AE model, an auxiliary dequantization model can be trained. In some cases, when using the RD-AE, only the discrete latents are transmitted, and the auxiliary dequantization model is used on the decoder side to infer the continuous latents from the discrete latents.

While the system 400 is shown to include certain components, one of ordinary skill will appreciate that the system 400 can include more or fewer components than those shown in FIG. 4. For example, the transmitting device 410 and/or the receiving device 420 of the system 400 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 4. The components shown in FIG. 4, and/or other components of the system 400, can be implemented using one or more compute or processing components. The one or more compute components can include a central processing unit (CPU), a graphics processing unit (GPU), a digital signal processor (DSP), and/or an image signal processor (ISP). An illustrative example of a computing device and hardware components that can be implemented with the system 1600 is described below with respect to FIG. 16.

The system 400 can be part of, or implemented by, a single computing device or multiple computing devices. In some examples, the transmitting device 410 can be part of a first device and the receiving device 420 can be part of a second computing device. In some examples, the transmitting device 410 and/or the receiving device 420 can be included as part of an electronic device (or devices) such as a telephone system (e.g., a smartphone, a cellular telephone, a conferencing system, etc.), a desktop computer, a laptop or notebook computer, a tablet computer, a set-top box, a smart television, a display device, a gaming console, a video streaming device, a SOC, an IoT (Internet-of-Things) device, a smart wearable device (e.g., a head-mounted display (HMD), smart glasses, etc.), a camera system (e.g., a digital camera, an IP camera, a video camera, a security camera, etc.), or any other suitable electronic device(s). In some cases, the system 400 can be implemented by the image processing system 100 shown in FIG. 1. In other cases, the system 400 can be implemented by one or more other systems or devices.

Figure 5A:
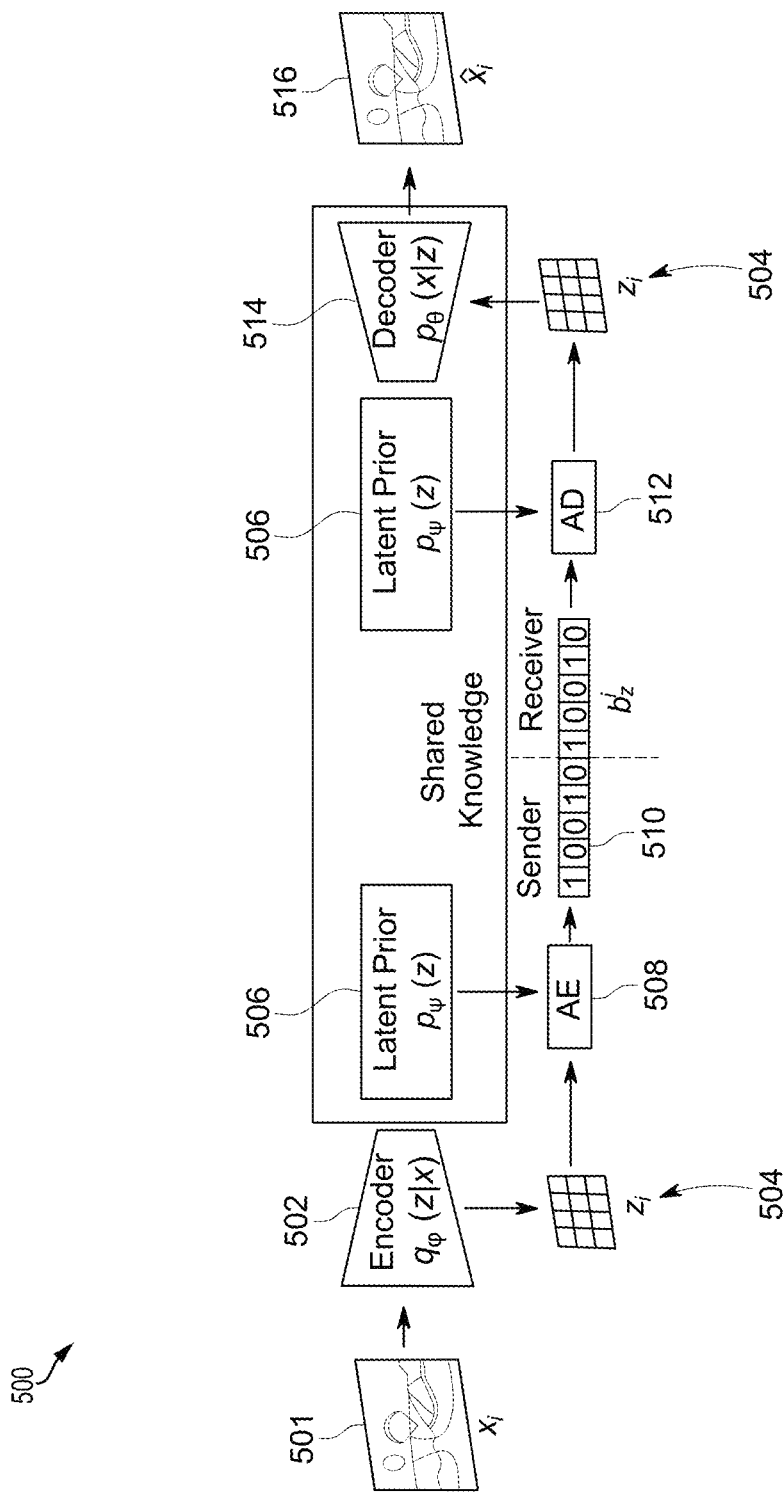
FIG. 5A and FIG. 5B are diagrams illustrating example rate-distortion autoencoder systems, in accordance with some examples of the present disclosure.

FIG. 5A is a diagram illustrating an example neural network compression system 500. In some examples, the neural network compression system 500 can include an RD-AE system. In FIG. 5A, the neural network compression system 500 includes an encoder 502, an arithmetic encoder 508, an arithmetic decoder 512, and a decoder 514. In some cases, the encoder 502 and/or decoder 514 can be the same as encoder 402 and/or decoder 403, respectively. In other cases, the encoder 502 and/or decoder 514 can be different than encoder 402 and/or decoder 403, respectively.

The encoder 502 can receive an image 501 (image $x_i$) as input and can map and/or convert the image 501 (image $x_i$) to a latent code 504 (latent $z_i$) in a latent code space. The image 501 can represent a still image and/or a video frame associated with a sequence of frames (e.g., a video). In some cases, the encoder 502 can perform a forward pass to generate the latent code 504. In some examples, the encoder 502 can implement a learnable function. In some cases, the encoder 502 can implement a learnable function parameterized by $\varphi$. For example, the encoder 502 can implement function $q_\varphi(z|x)$. In some examples, the learnable function does not need to be shared with, or known by, the decoder 514.

The arithmetic encoder 508 can generate a bitstream 510 based on the latent code 504 (latent $z_i$) and a latent prior 506. In some examples, the latent prior 506 can implement a learnable function. In some cases, the latent prior 506 can implement a learnable function parameterized by $\psi$. For example, the latent prior 506 can implement function $p_\psi(z)$. The latent prior 506 can be used to convert latent code 504 (latent $z_i$) into bitstream 510 using lossless compression. The latent prior 506 can be shared and/or made available at both the sender side (e.g., the encoder 502 and/or the arithmetic encoder 508) and the receiver side (e.g., the arithmetic decoder 512 and/or the decoder 514).

The decoder 514 can receive encoded bitstream 510 from the arithmetic encoder 508 and use the latent prior 506 to decode latent code 504 (latent $z_i$) in the encoded bitstream 510. The decoder 514 can decode latent code 504 (latent $z_i$) into approximate reconstruction image 516 (reconstruction $\hat{x}_i$). In some cases, the decoder 514 can implement a learnable function parameterized by $\theta$. For example, the decoder 514 can implement function $p_\theta(x|z)$. The learnable function implemented by the decoder 514 can be shared and/or made available at both the sender side (e.g., the encoder 502 and/or the arithmetic encoder 508) and the receiver side (e.g., the arithmetic decoder 512 and/or the decoder 514).

The neural network compression system 500 can be trained to minimize the rate-distortion. In some examples, the rate reflects the length of the bitstream 510 (bitstream b), and the distortion reflects the distortion between the image 501 (image $x_i$) and the reconstruction image 516 (reconstruction $\hat{x}_i$). A parameter $\beta$ can be used to train a model for a specific rate-distortion ratio. In some examples, the parameter $\beta$ can be used to define and/or implement a certain tradeoff between rate and distortion.

In some examples, a loss can be denoted as follows: $L_{RD}(x; \varphi, \psi, \theta) = E_{q_{\varphi(z|x)}}[-\log p_\theta(x|z) - \beta \log p_\psi(z)]$, where the function E is an expectation. The distortion (x|z; $\theta$) can be determined based on a loss function such as, for example, a mean squared error (MSE). In some examples, the terms— log $p_\theta(x|z)$ can indicate and/or represent the distortion $D(x|z; \theta)$.

The rate for sending latents can be denoted $R_z(z;\psi)$. In some examples, the terms log $p_\psi(z)$ can indicate and/or represent the rate $R_z(z;\psi)$. In some cases, the loss can be minimized over the full dataset D as follows: $\varphi_D^*, \psi_D^*, \theta_D^* = \text{argmin } E_{x \sim D}[L_{RD}(x; \varphi, \psi, \theta)]$.

Figure 5B:
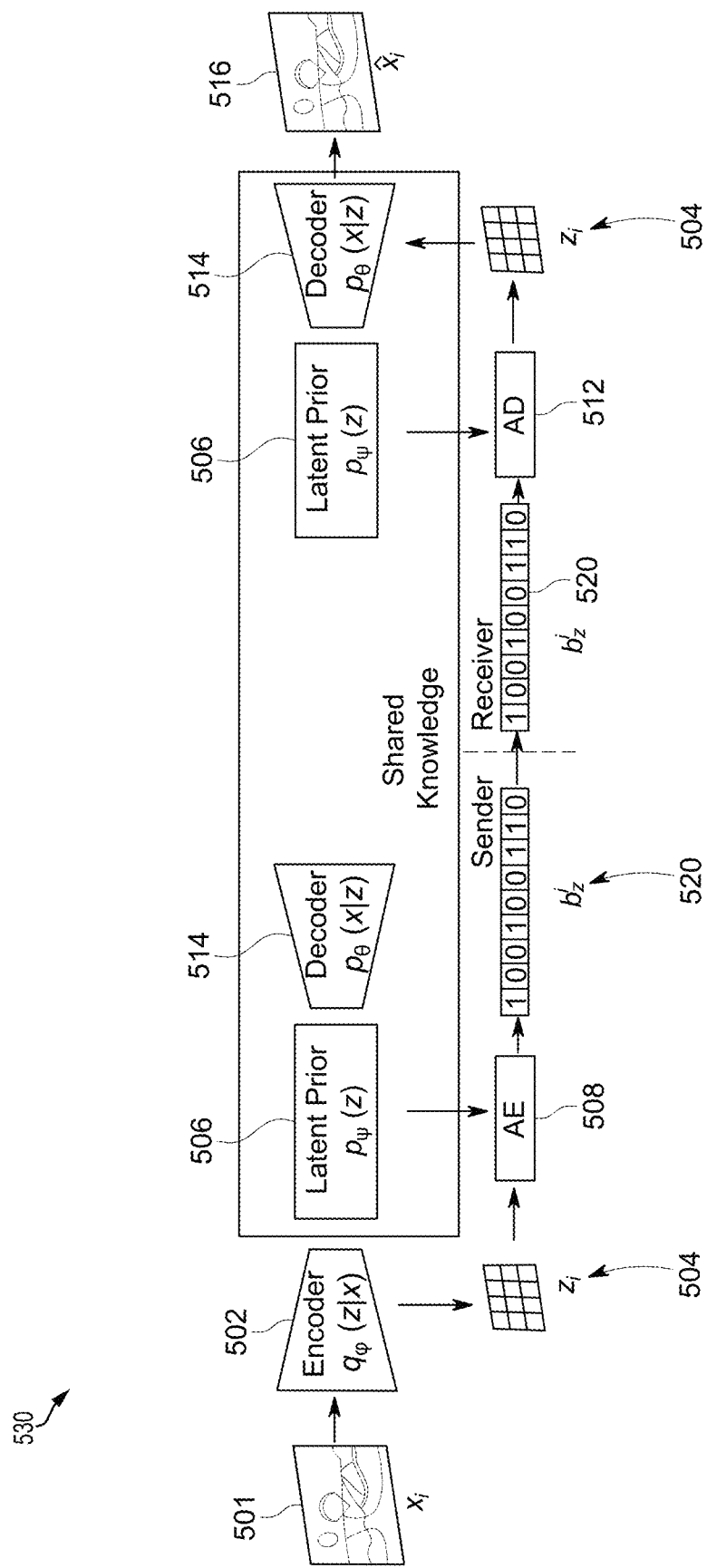

FIG. 5B is a diagram illustrating an inference process 530 performed by the neural network compression system 500. As shown, the encoder 502 can convert image 501 to latent code 504. In some examples, the image 501 can represent a still image and/or a video frame associated with a sequence of frames (e.g., a video).

In some examples, the encoder 502 can encode image 501 using a single forward pass $z = q_{\varphi_D}^*(z|x)$. The arithmetic encoder 508 can then perform arithmetic coding of latent code 504 (latent $z_i$) under the latent prior 506 to generate bitstream 520 ($b_z^i$). In some examples, the arithmetic encoder 508 can generate the bitstream 520 as follows: $b_z^i = AE(z|p_{\psi_D}^*(z))$.

The arithmetic decoder 512 can receive the bitstream 520 from the arithmetic encoder 508 and perform arithmetic decoding of latent code 504 (latent $z_i$) under the latent prior 506. In some examples, the arithmetic decoder 512 can decode the latent code 504 from the bitstream 520 as follows: $z = AD(b_z^i | p_{\psi_D}^*(z))$. The decoder 514 can decode latent code 504 (latent $z_i$) and generate reconstruction image 516 (reconstruction $\hat{x}_i$). In some examples, the decoder 514 can decode latent code 504 (latent $z_i$) using a single forward pass as follows: $\hat{x} = p_{\theta_D}^*(x|z)$.

In some examples, an RD-AE system can be trained using a set of training data and further fine-tuned for the datapoint (e.g., image data, video data, audio data) to be transmitted to and decoded by a receiver (e.g., a decoder). For example, at inference time, the RD-AE system can be fine-tuned on the image data being transmitted to the receiver. Since compression models are generally large, sending the parameters associated with the model to the receiver can be very costly in terms of resources such as network (e.g., bandwidth, etc.), storage and compute resources. In some cases, the RD-AE system can be fine-tuned on a single datapoint being compressed and sent to a receiver for decompression. This can limit the amount of information (and associated cost) that is sent to the receiver, while maintaining and/or increasing a compression/decompression efficiency, performance, and/or quality.

Figure 6:
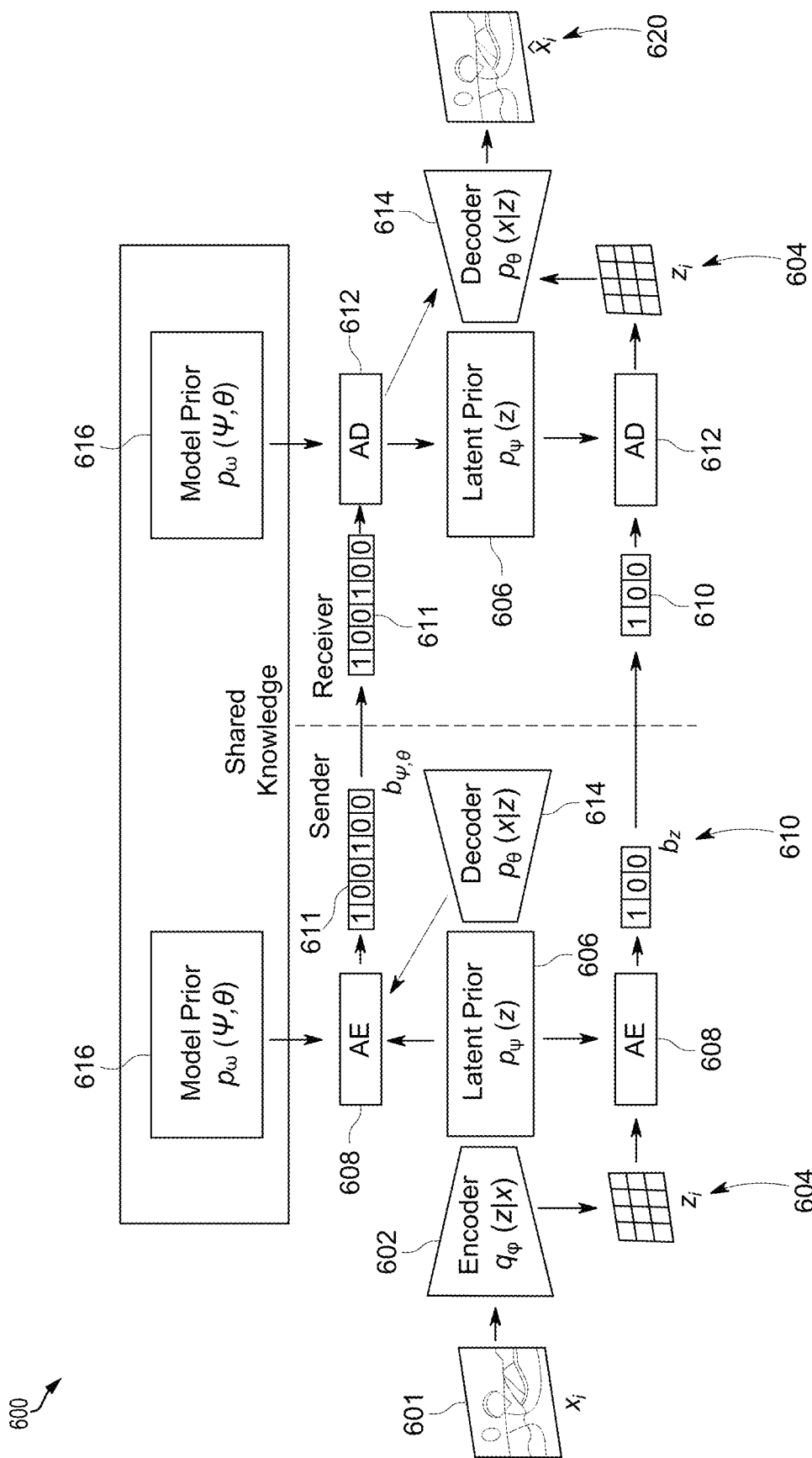
FIG. 6 is a diagram illustrating an example inference process implemented by an example neural network compression system fine-tuned using a model prior, in accordance with some examples of the present disclosure.

FIG. 6 is a diagram illustrating an example inference process implemented by an example neural network compression system 600 fine-tuned using a model prior. In some examples, the neural network compression system 600 can include an RD-AE system fine-tuned using an RDM-AE model prior. In some cases, the neural network compression system 600 can include an AE model fine-tuned using the model prior.

In this illustrative example, the neural network compression system 600 includes the encoder 602, the arithmetic encoder 608, the arithmetic decoder 612, the decoder 614, a model prior 616 and latent prior 606. In some cases, the encoder 602 can be the same as or different than encoder 402 or encoder 502, and the decoder 614 can be the same as or different than decoder 403 or decoder 514. The arithmetic encoder 608 can be the same as or different than the arithmetic coder 406 or the arithmetic encoder 508 and the arithmetic decoder 612 can be the same as or different than the arithmetic decoder 426 or the arithmetic decoder 512.

The neural network compression system 600 can generate latent code 604 (latent $z_i$) for the image 601. The neural network compression system 600 can use the latent code 604 and the latent prior 606 to encode the image 601 (image $x_i$) and generate a bitstream 610 that can be used by a receiver to generate a reconstruction image 620 (reconstruction $\hat{x}_i$). In some examples, the image 601 can represent a still image and/or a video frame associated with a sequence of frames (e.g., a video).

In some examples, the neural network compression system 600 can be fine-tuned using an RDM-AE loss. The neural network compression system 600 can be trained by minimizing the rate-distortion-model rate (RDM) loss. In some examples, at the encoder side, the AE model can be fine-tuned on the image 601 (image $x_i$) using an RDM loss as follows: $\varphi_D^*, \psi_D^*, \theta_D^* = \text{argmin } L_{RD}(x; \varphi, \psi, \theta, \omega)$.

The fine-tuned encoder 602 can encode the image 601 (image $x_i$) to generate a latent code 604. In some cases, the fine-tuned encoder 602 can encode the image 601 (image $x_i$) using a single forward pass as follows $z = q_{\varphi_x}^*(z|x)$. The arithmetic encoder 608 can use the latent prior 606 to convert the latent code 604 into a bitstream 610 for the arithmetic decoder 612. The arithmetic encoder 608 can entropy-code parameters of the fine-tuned decoder 614 and the fine-tuned latent prior 606 under the model prior 616, and generate a bitstream 611 including the compressed parameters of the fine-tuned decoder 614 and the fine-tuned latent prior 606. In some examples, the bitstream 611 can include updated parameters of the fine-tuned decoder 614 and the fine-tuned latent prior 606. The updated parameters can include, for example, parameter updates relative to a baseline decoder and latent prior, such as the decoder 614 and latent prior 606 prior to fine-tuning.

In some cases, the fine-tuned latent prior 606 can be entropy-coded under the model prior 616 as follows $b_\psi^i = \text{AE}(\psi_x^* | p_\omega(\psi))$, the fine-tuned decoder 614 can be entropy-coded under the model prior 616 as follows $b_\theta^i = \text{AE}(\theta_x^* | p_\omega(\theta))$, and the latent code 604 (latent $z_i$) can be entropy-coded under the fine-tuned latent prior 606 as follows $b_z^i = \text{AE}(z | p_{\psi_x}^*(z))$. In some cases, at the decoder side, the fine-tuned latent prior 606 can be entropy-coded under the model prior 616 as follows $\omega_x^* = \text{AD}(b_\psi^i | p_\omega(\psi))$, the fine-tuned decoder 614 can be entropy-coded under the model prior 616 as follows $\theta_x^* = \text{AD}(b_\theta^i | p_\omega(\theta))$, and the latent code 604 (latent $z_i$) can be entropy-coded under the fine-tuned latent prior 606 as follows $z = \text{AD}(b_z^i | p_{\psi_x}^*(z))$.

The decoder 614 can decode the latent code 604 (latent $z_i$) into approximate reconstruction image 620 (reconstruction $\hat{x}_i$). In some examples, the decoder 614 can decode the latent code 604 using a single forward pass of the fine-tuned decoder as follows $\hat{x} = p_{\theta_x}^*(x|z)$.

As previously explained, the neural network compression system 600 can be trained by minimizing the RDM loss. In some cases, the rate can reflect the length of the bitstream b (e.g., bitstream 610 and/or 611), distortion can reflect the distortion between the input image 601 (image $x_i$) and the reconstruction image 620 (reconstruction $\hat{x}_i$), and the model-rate can reflect the length of the bitstream used and/or needed to send model updates (e.g., updated parameters) to a receiver (e.g., to decoder 614). A parameter $\beta$ can be used to train a model for a specific rate-distortion ratio.

In some examples, a loss for the datapoint x can be minimized at inference time as follows: $\varphi_x^*, \psi_x^*, \theta_x^* = \text{argmin } L_{RDM}(x; \varphi, \omega, \theta, \omega)$. In some examples, the RDM loss can be denoted as follows: $L\_RDM(x; \varphi, \psi, \theta, \omega) = E_{q_\varphi} q\_(z|x) [-\log p_\theta(x|z) - \beta \log p_\psi(z) - \beta \log p_\omega(\psi, \theta)]$. In some cases, the distortion $D(x|z; \theta)$ can be determined based on a loss function such as, for example, a mean squared error (MSE).

The terms $-\log p_\theta(x|z)$ can indicate and/or represent the distortion $D(x|z; \theta)$. The terms $\beta \log p_\omega(z)$ can indicate and/or represent the rate for sending latents $R_z(z; \psi)$, and the terms $\beta \log p_\omega(\psi, \theta)$ can indicate and/or represent the rate for sending fine-tuned model updates $R_{\psi,\theta}(\psi, \theta; \omega)$.

In some cases, the model prior 616 can reflect the length of the bitrate overhead for sending model updates. In some examples, the bitrate for sending model updates can be described as follows: $|b_{\psi,\theta}^i| = R_{\psi,\theta}(\psi, \theta; \omega) = -\log p_\omega(\psi, \theta)$. In some cases, the model prior can be selected so that sending a model without updates is cheap, that is, the bitlength (model-rate-loss) is small: $R_{\psi,\theta}(\psi_D^*, \theta_D^*; \omega)$.

In some cases, using the RDM loss function, the neural network compression system 600 may only add bits to the bitstream for the model updates $b_{\psi,\theta}^i$ if the latent rate or distortion decreases with at least as many bits. This may provide a boost to rate-distortion (R/D) performance. For example, the neural network compression system 600 may increase the number of bits in the bitstream 611 for sending model updates if it can also decrease the rate or distortion with at least the same number of bits. In other cases, the neural network compression system 600 may add bits to the bitstream for the model updates $b_{\psi,\theta}^i$ even if the latent rate or distortion does not decrease with at least as many bits.

The neural network compression system 600 can be trained end-to-end. In some cases, the RDM loss can be minimized at inference time end-to-end. In some examples, a certain amount of compute can be spent once (e.g., fine-tuning the model) and high compression ratios can be subsequently obtained without extra cost to the receiver side. For example, a content provider may spend a high amount of compute to more extensively train and fine-tune the neural network compression system 600 for a video that will be provided to a large number of receivers. The highly trained and fine-tuned neural network compression system 600 can provide a high compression performance for that video. Having spent the high amount of compute, the video provider can store the updated parameters of the model prior and efficiently provide to each receiver of the compressed video to decompress the video. The video provider can achieve large benefits in compression (and reduction in network and compute resources) with each transmission of the video which can significantly outweigh the initial compute costs of training and fine-tuning the model.

Due to the large number of pixels in video and images (e.g., high resolution images), the training/learning and fine-tuning approaches described above can be very advantageous for video compression and/or high resolution images. In some cases, complexity and/or decoder compute can be used as added considerations for the overall system design and/or implementation. For example, very small networks that are fast to do inference on can be fine-tuned. As another example, a cost term can be added for receiver complexity, which can force and/or cause the model to remove one or more layers. In some examples, more complex model priors can be learned using machine learning to achieve even larger gains.

A model prior design can include various attributes. In some examples, the model prior implemented can include a model prior that assigns a high probability $p_\omega(\psi_D^*, \theta_D^*)$ for sending a model without any updates, and thus a low bitrate: $R_{\psi,\theta}(\psi_D^*, \theta_D^*; \omega)$. In some cases, the model prior can include a model prior that assigns a non-zero probability to values around $\psi_D^*, \theta_D^*$ so different instances of fine-tuned models can be encoded in practice. In some cases, the model prior can include a model prior that can be quantized at inference time and used to do entropy coding.

Despite accelerated research developments, implementation of such machine learning based compressions systems presents certain drawbacks. For example, neural compression algorithms require large neural networks that can result in increased computational and/or memory requirements. In addition, the optimal settings or parameters (e.g., weights) that are used in a deep neural network depend on the training dataset and may not perform well when used with different data. For instance, neural video codecs that are trained on natural scenes may not perform well on animated scenes. Furthermore, while certain neural networks can be fine-tuned based on each instance, the transmission of the updated, fine-tuned parameters to the decoder can cause a substantial increase in the file size and/or bitrate.

As noted above, systems and techniques are described herein for the compression and decompression of content using one or more machine learning (ML) systems, which can address the above-noted issues. For instance, aspects of the present disclosure include a machine learning system (e.g., one or more neural networks such as a rate-distortion autoencoder (RD-AE) or other neural network) that can be trained to minimize the average rate-distortion loss over a dataset of data points, such as image and/or video data points. In some examples, a set of global model parameters (e.g., weights) can be associated with the trained machine learning system. In some cases, training of the machine learning system can include identifying parameters (e.g., a weight vector) that are associated with each iteration of training. For example, a weight vector can correspond to each training iteration and the global model parameters can correspond to the weight vector for the trained neural network.

In some examples, training of the machine learning system can include determining a subspace or manifold of model parameters having a lower dimension than the full parameter space. In some aspects, the subspace or manifold of model parameters includes a portion of the weight vectors associated with each iteration of training. In some cases, the subspace or manifold of model parameters can be determined using Principal Component Analysis (PCA). For example, PCA can be used to identify one or more directions and/or trajectories in the full parameter space in which model parameters performed well during training of the neural network (e.g., loss function was below a threshold value). In some aspects, a sparse PCA can be used to reduce the size of the subspace of model parameters. In some examples, the subspace or manifold of model parameters can be shared with a neural network that is configured to decode the encoded data.

In some examples, the machine learning system can be fine-tuned (e.g., trained, fitted) for input data that is to be compressed and transmitted to a receiving device including a decoder (which can also include a machine learning system). In some aspects, fine-tuning the machine learning system can be performed using the subspace or manifold of model parameters. For example, fine-tuning of the neural network can include selecting a set of updated model parameters that correspond to a weight vector that is part of subspace or manifold of model parameters (e.g., selecting an optimal weight vector for the instance). In some cases, the set of updated parameters (e.g., the weight vector selected during fine-tuning) can be associated with one or more subspace coordinates. In one example, the one or more subspace coordinates can be relative to the set of global parameters (e.g., the subspace coordinates can correspond to a trajectory that is relative to the set of global parameters).

In some aspects, the set of updated parameters can be used to encode the input data. In some examples, the machine learning system can further include an arithmetic coder (e.g., including an arithmetic encoder, an arithmetic decoder, or a combined arithmetic encoder-decoder). The arithmetic coder (e.g., an arithmetic encoder or a combined arithmetic encoder-decoder) can generate a bitstream including a compressed version of the input data. In some cases, the bitstream can also include a compressed version of the one or more subspace coordinates that correspond to the set of updated model parameters. In some cases, the receiving device can receive the bitstream. The decoder of the receiving device can use the one or more subspace coordinates to determine the updated model parameters for the neural network. A machine learning system (e.g., a neural network, such as an RD-AE or other neural network) of the decoder can use the updated model parameters to decode the compressed input data.

In some aspects, the systems and techniques disclosed herein can be used to improve compression performance by adapting neural network to each data instance. In some examples, the systems and techniques disclosed herein can reduce the bitrate and/or file size for sending network parameter updates (e.g., fine-tuning neural network) to a decoder by selecting the fine-tuned weight vectors from a lower-dimensional subspace.

Figure 7:
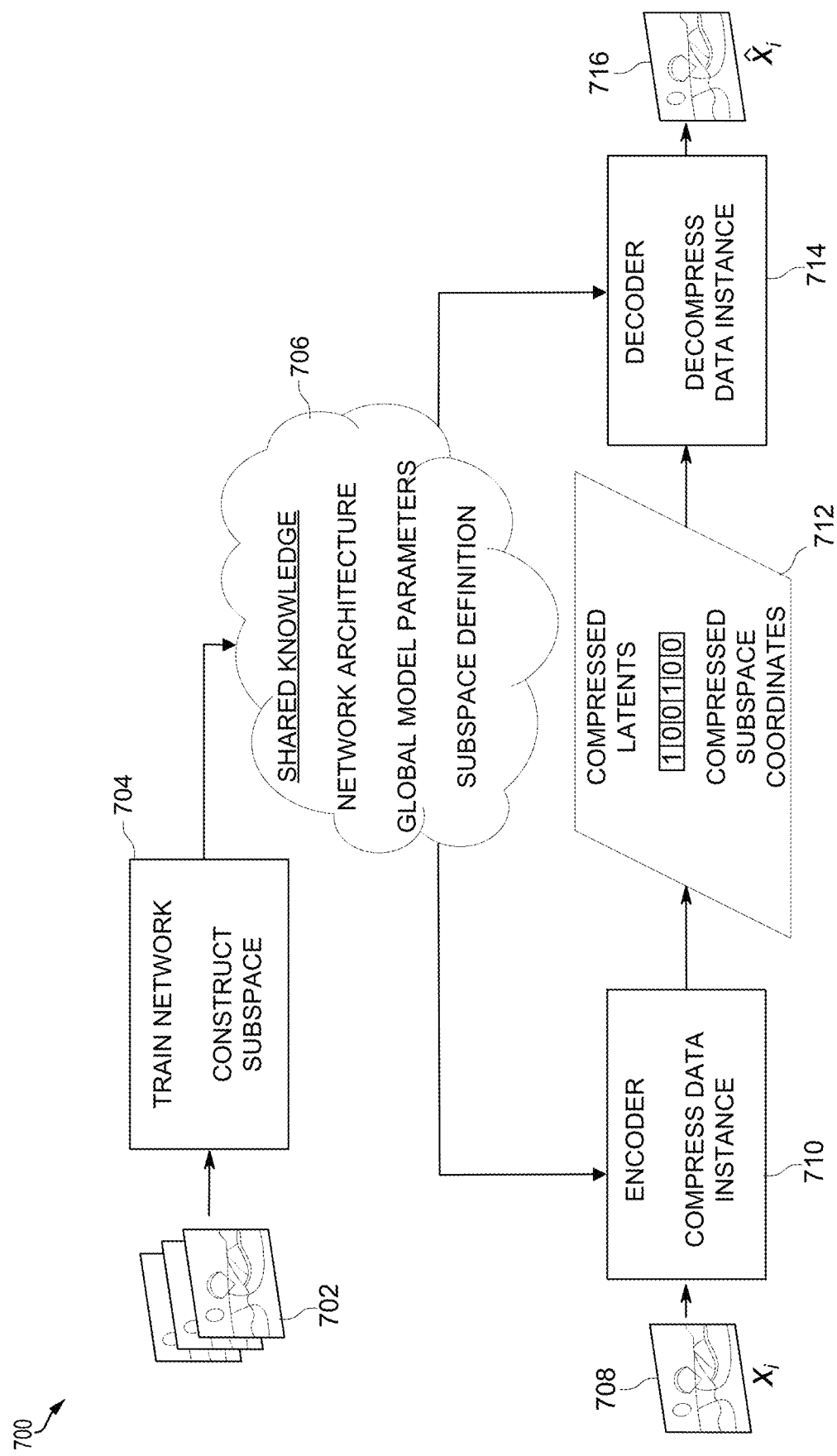
FIG. 7 is a diagram illustrating an example instance-adaptive process implemented by an example neural network compression system fine-tuned within a network parameter subspace, in accordance with some examples of the present disclosure.

FIG. 7 is a diagram illustrating an instance-adaptive process implemented by an example neural network compression system 700. In some aspects, the neural network compression system 700 can include an encoder 710 and a decoder 714 that can be configured to perform compression and/or decompression of image, video, and/or audio data. In some cases, the encoder 710 and the decoder 714 can be part of the same device. In other cases, the encoder 710 and the decoder 714 can be part of different devices. In some examples, the encoder 710 and/or the decoder 714 can include, determine, or otherwise have access to one or more aspects of shared knowledge 706 associated with the neural network compression system 700. In some cases, shared knowledge 706 can include the network architecture (e.g., deep learning neural network architecture), global model parameters (e.g., network weights), and/or a subspace definition (as discussed further below).

In some examples, neural network compression system 700 can be trained using one or more training data sets that can include images, videos, audio, etc. (e.g., training data 702). For instance, network training 704 can be implemented using the training data 702 to determine parameters (e.g., weights, biases, etc.) for the neural network compression system 700. In some cases, network training 704 can include an iterative flow of training data 702 through neural network compression system 700 (e.g., using backpropagation training techniques). In some aspects, the parameters (e.g., weights, biases, etc.) for the trained neural network compression system 700 can be referred to as the global model parameters.

In some aspects, network training 704 can be used to generate, construct, determine, and/or otherwise define a subspace or manifold of network parameters. In some cases, the subspace or manifold of network parameters can be determined based on the sets of model parameters (e.g., weights) that are associated with network training 704. For instance, a weight vector (e.g., set of network parameters) can be determined during each iteration of network training 704. In some examples, weight vectors that are associated with a threshold level of performance during network training 704 can be used to define the subspace or manifold of network parameters. In one illustrative example, the threshold level of performance can be determined based on a loss function associated with a data rate and/or a distortion metric (e.g., rate-distortion-model rate (RDM) loss). In some aspects, the subspace or manifold of network parameters can be defined based on an 'N' number of highest performing weight vectors during network training 704 (e.g., the 100 highest performing weight vectors).

In one example, the subspace or manifold of network parameters can be represented as a matrix M and may be defined according to the relationship given by equation (1) below, in which $\theta$ corresponds to the optimized parameters of the compression network for a given instance (e.g., a video); $\theta_{global}$ corresponds to the global model parameters (e.g., weights, biases, etc. for the trained neural network that may be stored on sender and/or receiver device); M corresponds to a matrix that defines the subspace; and $\delta$ corresponds to a vector of subspace coordinates (e.g., updates that can be determined for each instance).

$$\theta = \theta_{global} + M\delta \quad (1)$$

In some aspects, the subspace M of network parameters can be determined using a machine learning method. For instance, a meta-learning machine learning algorithm (e.g., model-agnostic meta-learning (MAML)) may be implemented to determine subspace M. In some aspects, MAML may be used to train the neural network compression system 700 (e.g., the global model) together with the definition of the subspace M (e.g., the function that can map the transmitted coordinates $\delta$ to the network parameter space).

Figure 10:
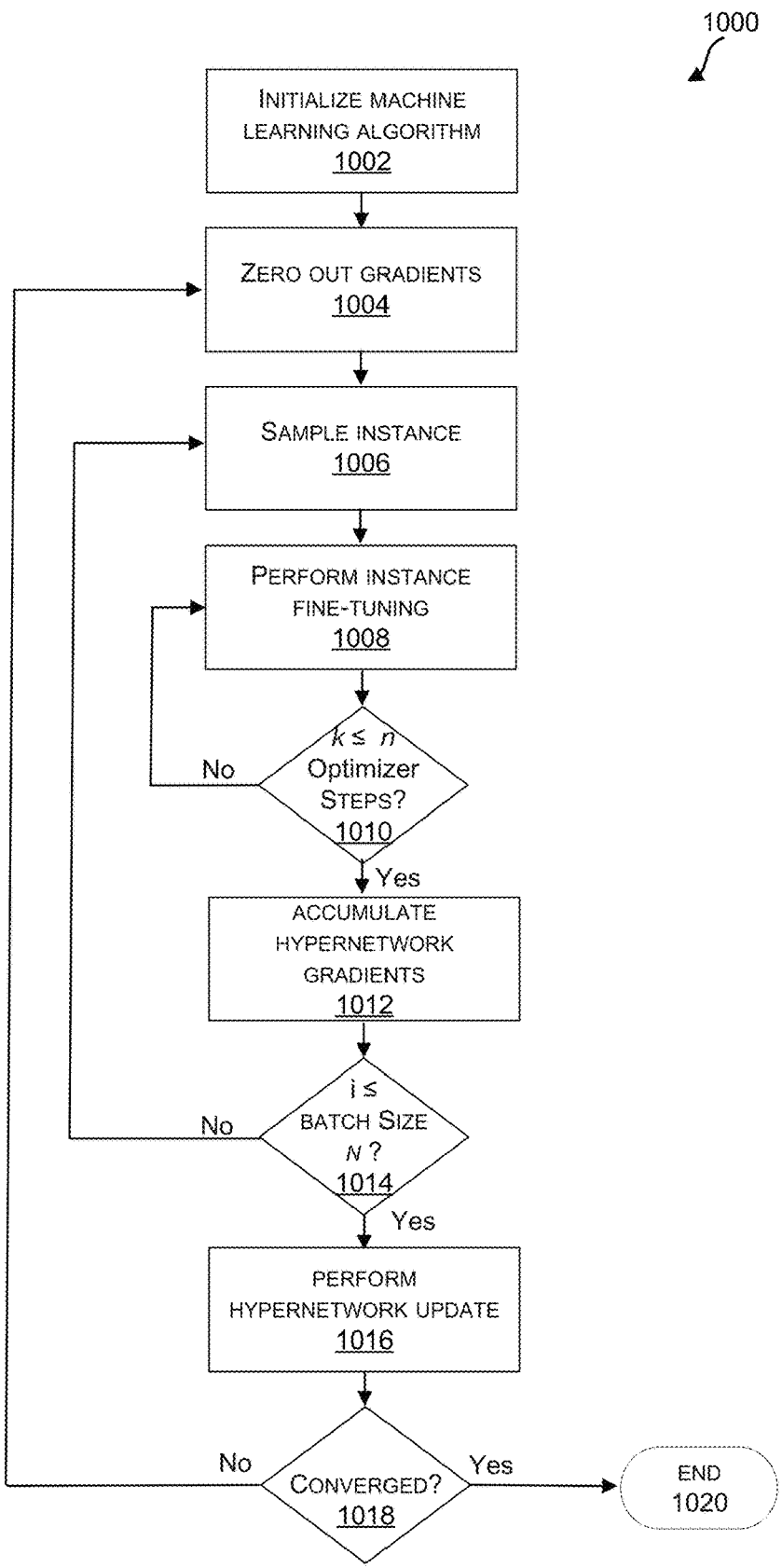
FIG. 10 is a flowchart illustrating an example of a process for determining a subspace, in accordance with some examples of the present disclosure.

FIG. 10 is a diagram illustrating an example process 1000 for training a neural network compression system (e.g., system 700) and determining a subspace of network parameters. At block 1002, the process 1000 can include initializing the machine learning algorithm. In some aspects, the machine learning algorithm may correspond to a model-agnostic meta-learning (MAML) algorithm. In some cases, initialization of the machine learning algorithm can include defining and/or initializing one or more parameters, constraints, variables, etc. For example, initialization of the machine learning algorithm can include defining a training dataset $\rho(x)$ having x instances. In some cases, initialization of the machine learning algorithm can include defining a compression model $f_\theta(x)$ having weights $\theta$. In some examples, initialization of the machine learning algorithm can include defining a hypernetwork $\theta = g_\omega(\delta)$ with instance parameters $\delta$ and weights $\psi$. In some aspects, initialization of the machine learning algorithm can include defining a rate-distortion loss $L(x, \delta, \psi)$ which may include a model update rate (e.g., rate-distortion-model loss). In some cases, initialization of the machine learning algorithm can include initialization of the weights (e.g., $\psi \leftarrow \omega_0$); a batch size N of training data; learning rates $\alpha$, $\beta$; and/or a number of optimizer steps n.

At block 1004, the process 1000 can include zeroing out gradients. In some aspects, zeroing out gradients can be represented as $\Delta\psi \leftarrow \psi_0$. At block 1006, the method 1000 can include sampling an instance (e.g., input data). In some cases, sampling an instance can be represented as: $x_i \sim \rho(x)$; $\delta_i \leftarrow 0$. At block 1008, the process 1000 can include performing instance fine-tuning. In some aspects, instance fine-tuning can be represented as: $\delta_i \leftarrow \delta_i - \alpha \nabla_\delta L(x_i, \delta_i, \psi)$. At block 1010, the process 1000 can determine whether k is less than or equal to n number of optimizer steps. If so, the process 1000 can increase value for index k and return to block 1008 and repeat instance fine-tuning. If k is greater than n, the process can proceed to block 1012 and accumulate hypernetwork gradients. In some examples, accumulating hypernetwork gradients can be represented as: $\Delta\psi \leftarrow \Delta\psi - \beta \nabla_\psi L(x_i; \delta_i, \psi)$.

At block 1014, the process 1000 can determine whether i is less than or equal to N batch size. If so, the process 1000 can increase value for index i and return to block 1006 and repeat the operations of blocks 1006 to 1012. If i is greater than N, the process can proceed to block 1016 and perform a hypernetwork update. In some aspects, performing a hypernetwork update can be represented as: $\psi \leftarrow \psi + \Delta\psi$. At block 1018, the process 1000 can determine whether the model has converged (e.g., based on error range or loss function). If the model is not converged, the process 1000 can return to block 1004 (e.g., zero out gradients) and repeat the operations of blocks 1004 to 1016. If the model is converged, the process 1000 can proceed to block 1020 in which the process 1000 may conclude.

Referring back to FIG. 7, in some examples, network training 704 can include a principal component analysis (PCA) algorithm that can be used to determine the subspace M of network parameters. For instance, PCA can be used to determine one or more directions and/or trajectories in the full parameter space in which model parameters performed well during network training 704 (e.g., based on loss function). In some examples, PCA can be used to reduce the dimensionality of the parameter space into principal components. In some aspects, PCA can be used to determine subspace M by training a compression model for k steps and saving the value of the n network parameters after each step. In some examples, the corresponding network parameters can be arranged in a k×n matrix that can be referred to as A. In some cases, a singular value decomposition may be applied to matrix A. In some aspects, the first m eigenvectors can be obtained according to the singular value decomposition (e.g., sorted by decreasing eigenvalue) and may be arranged in a k×m matrix. In some examples, the k×m matrix can correspond to matrix M (e.g., as used in equation (1)). In some instances, matrix component $M_{ij}$ can correspond to the i-th component of the j-th eigenvector of matrix A.

In some aspects, a sparse PCA can be used to reduce the size of the subspace M of network parameters (e.g., by applying a sparsity constraint to the input variables). In one illustrative example, sparse PCA can be implemented by first applying PCA as noted above to determine subspace matrix M. In some aspects, a sparse PCA can include reducing the size of M by keeping the p components having the largest absolute value and setting all other components to a value of zero. In some cases, p can be selected such that p<m. In some examples, sparse PCA can be used to determine a k×m sized matrix having k×p entries that are non-zero. In some aspects, the memory requirement for M may be substantially reduced by storing only the non-zero entries as determined using sparse PCA.

Figure 8:
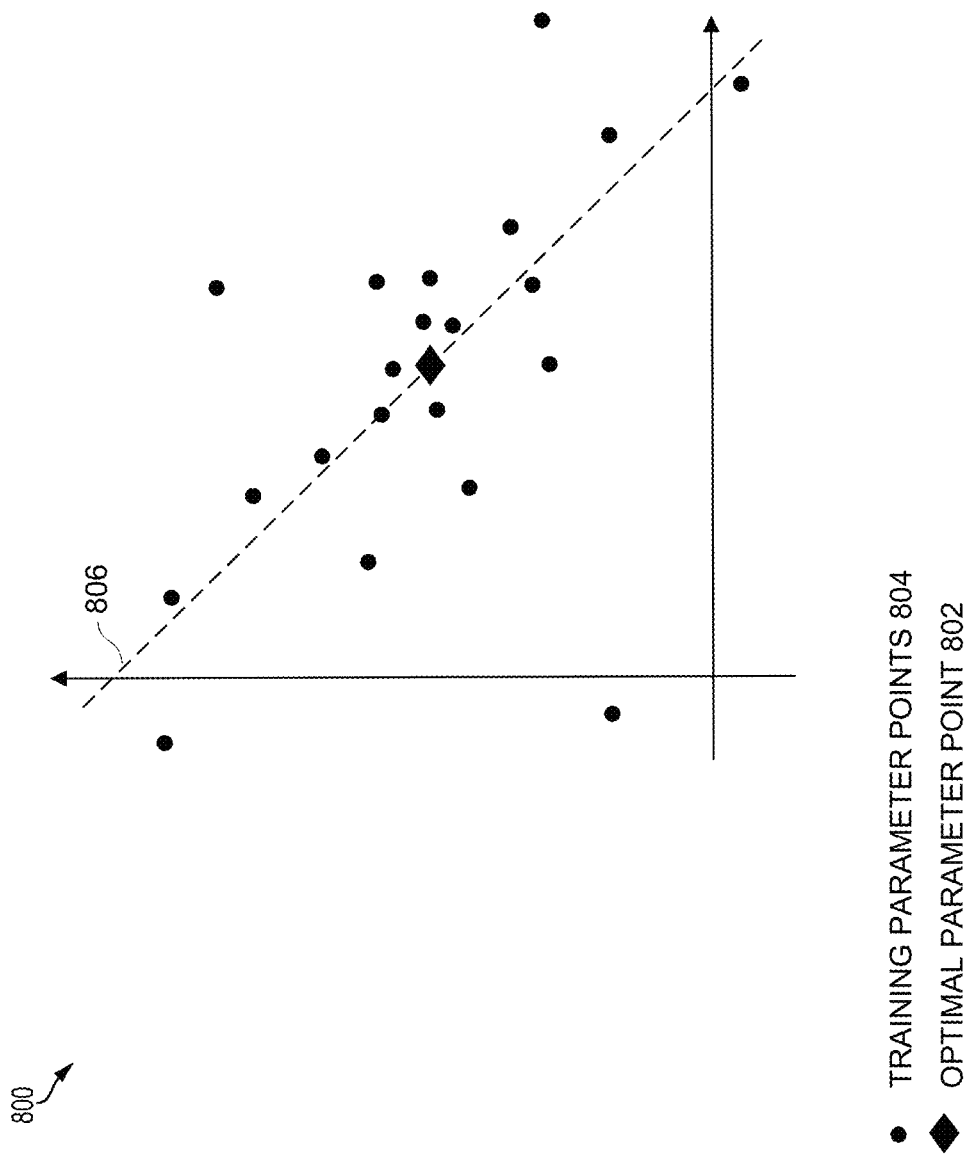
FIG. 8 is a graph illustrating an example network parameter subspace, in accordance with some examples of the present disclosure.

FIG. 8 is a graph 800 illustrating an example of a one-dimensional subspace 806. As illustrated, graph 800 includes numerous training parameter points 804. In some aspects, each respective one of the training parameter points 804 can correspond to a weight vector (e.g., a set of network parameters) used or visited during network training 704. Graph 800 also includes optimal parameter point 802 which can correspond to the set of global model parameters for fully trained neural network compression system 700.

As noted above, in some examples, PCA can be used to process the training parameter points 804 to determine subspace 806. For example, during network training 704 of the global model, PCA can be used to find the leading principal components of the optimizer trajectory (e.g., based on weight vectors corresponding to training iterations). In one example, the data set upon which PCA is run is constructed by looking at how the model develops during the course of training. For instance, after every training iteration, a snapshot of the parameters of the model can be determined. Once a certain number of parameter snapshots (e.g., 1000 sets of parameters, 2000 sets of parameters, etc.), there are that number of data points for which PCA can be run to determine the most important directions (corresponding to the leading principal components) during training. In some aspects, the leading principal components of the optimizer trajectory can be used to define the subspace 806. In some cases, subspace 806 can correspond to a matrix (e.g., subspace matrix M) that parameterizes directions from the optimal parameter point 802. The subspace 806 can be used to constrain the values by which the neural network can be updated (e.g., the parameters of the neural network can only be updated to values that are included in the subspace). By constraining parameter updates of the neural network to the subspace 806, the rate will be greatly reduced (e.g., because only changes along the subspace need to be transmitted to the receiver, such as by sending a set of subspace coordinates as described below), with minimal impact to distortion, thus improving the overall coding performance of the system.

In some cases, subspace 806 can be defined during network training 704 and/or after network training 704. For example, manifold-aware training of the global model can be implemented to define subspace 806 during training of neural network compression system 700.

Although subspace 806 is illustrated a one-dimensional subspace, those skilled in the art will recognize that the present technology can be used to define a subspace having any number of dimensions. In one illustrative example, neural network compression system 700 can be associated with a parameter space that includes millions of weights and subspace 806 can have thousands of dimensions.

Referring back to FIG. 7, neural network compression system 700 can include encoder 710. In some examples, encoder 710 can be configured to receive, process, compress, and/or encode input data 708. In some cases, input data 708 can include image data, video data, and/or audio data. In some aspects, encoder 710 can fine-tune the global model parameters based on input data 708 by selecting and using a modified set of parameters from the subspace.

In some cases, fine-tuning the global model parameters can be based on a bit size of the compressed version of the input data (e.g., rate cost) and/or a distortion between the input data and reconstructed data generated from the compressed version of the input data. In one illustrative example, encoder 710 can iteratively encode input data 708 using sets of parameters that are part of the subspace or manifold of network parameters that were defined during network training 704. In some aspects, encoder 710 can select a modified set of parameters (e.g., from the subspace of network parameters) that optimizes a loss function.

In some examples, encoder 710 can determine a model update corresponding to a difference between the global model parameters and the modified set of parameters. In some aspects, the model update can correspond to a vector, a set of coordinates, a matrix, a formula, and/or any other suitable representation that can indicate a shift in one or more of the global model parameters.

Figure 9:
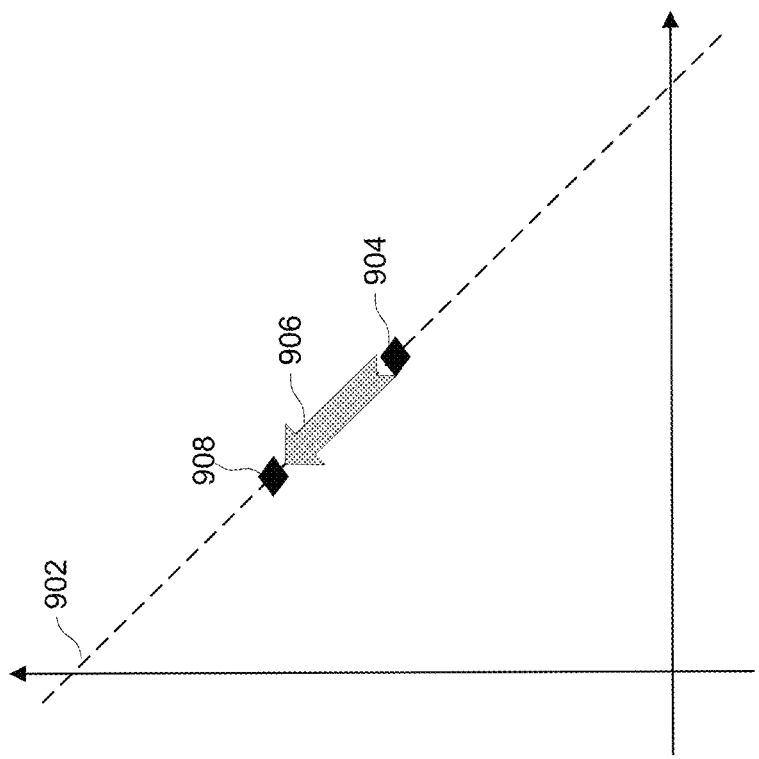
FIG. 9 is a graph illustrating an update to network parameters within a subspace, in accordance with some examples of the present disclosure.

FIG. 9 is a graph 900 illustrating a model update 906 within a subspace 902. In some cases, the subspace 902 corresponds to the subspace 806 defined during network training 704 and/or after network training 704. In some aspects, encoder 710 can be configured to operate using a set of global model parameters 904. In some examples, encoder 710 can fine-tune the set of global model parameters based on the input data 708 (which is the particular instance being encoded). In some aspects, fine-tuning of the set of global model parameters can include selecting a modified set of parameters 908 from within the subspace 902. In some cases, the modified set of parameters 908 from within the subspace 902 can be selected based on a loss function. In one illustrative example, the loss function can include a combination of the bitrate that it would take to transmit all of the information that is output and the distortion indicating the quality of the information. In some aspects, the loss function may be represented by the relationship given by equation (2) below, in which the first term corresponds to the distortion measured as the mean squared error between the original data x and the reconstructed data x'; the second term corresponds to the rate needed to transmit the latent code z, weighted by a hyperparameter β; and the last term corresponds to the rate needed to transmit the model update vector δ, weighted by the same factor β.

$$L = \text{MSE}(x, x') - \beta \log p(z) - \beta \log p(\delta) \quad (2)$$

In some aspects, encoder 710 can determine the model update 906 by determining a difference between the global model parameters 904 and the modified set of parameters 908. In some cases, model update 906 can include a set of subspace coordinates. For example, the set of subspace coordinates can indicate the delta between the subspace 902 and the model update 906. The decoder 714 can use the set of subspace coordinates to determine the modified set of parameters 908. For instance, because the decoder already has a definition of the subspace 902, the decoder can use the set of subspace coordinates to reference the subspace 902 (e.g., a matrix defining the subspace) and determine the new parameters (e.g., weights, biases, etc.) to use for decoding the data instance corresponding to input data 708. In some examples, model update 906 (e.g., the set of subspace coordinates) can correspond to or refer to the matrix of values defining the subspace 902 that can be used by decoder 714 to determine the modified set of parameters 908. In one illustrative example, the modified set of parameters 908 can be determined as follows: Updated Parameter Point (e.g., 908)=(Global Parameter Point (e.g., 904)+Subspace Matrix (e.g., 902))*Subspace Update (e.g., 906).

In one illustrative example, a three-dimensional parameter space can be represented by a matrix M and sub-space coordinates can be represented by δ, as follows:

$$M = \begin{pmatrix} 1 & 0 \\ 1 & 1 \\ 0 & -1 \end{pmatrix} \quad \delta = \begin{pmatrix} 0.5 \\ -0.5 \end{pmatrix}$$

In some examples, the columns of matrix M can indicated the subspace directions (e.g., the first column can point diagonally between the first and second network parameters). In some aspects, an update where the first component δ is non-zero can modify the value of the first and second neural network parameters. In some cases, the second column can be used to represent changes to the second and third network parameters. In some cases, the model update δ illustrated above can correspond to a change of +0.5 for the first network parameter, 0 for the second network parameter, and −0.5 for the third network parameter.

Referring back to FIG. 7, in some cases, encoder 710 can encode input data 708 into latent variables using the optimized network (e.g., using the modified set of parameters from the subspace of network parameters). In some examples, neural network compression system 700 can also include a probabilistic model (e.g., latent prior 606) that can losslessly compress the latent variables. In some cases, the probabilistic model can generate a probability distribution over the set of latent variables that can represent encoded data based on the input data 708.

In some aspects, encoder 710 can encode the model update (e.g., model update 906, such as the set of subspace coordinates and/or the matrix of values described above) into latent variables (e.g., under a model prior). In some examples, neural network compression system 700 can include an arithmetic encoder (e.g., arithmetic encoder 608) that can entropy-code the compressed model update and/or the compressed latent variables and generate one or more bitstreams (e.g., bitstream 712).

In some aspects, bitstream 712 can be sent or transmitted to decoder 714. In some examples, decoder 714 can receive the bitstream 712 and can decompress the bitstream 712 to obtain the latent variables and/or the model update (e.g., the set of subspace coordinates, the matrix of values, etc.). In some cases, decoder 714 can determine a modified set of parameters based on the model update and the subspace definition (e.g., from shared knowledge 706, received from encoder 710, determined by decoder 714). For example, decoder 714 can determine the modified set of parameters by applying the model update to the global model parameters. With reference to FIG. 9, decoder 714 can determine the modified set of parameters 908 by applying model update 906 to the global model parameters 904. For instance, the decoder 714 can determine the updated parameters for the global model parameters 904: Updated Parameter Point (e.g., 908)=(Global Parameter Point (e.g., 904)+Subspace Matrix (e.g., 902))*Subspace Update (e.g., 906).

In some examples, decoder 714 can use the modified set of parameters (e.g., updated weights from the parameter subspace) to decode the latent variables corresponding to input data 708. In some aspects, decoder 714 can use the modified set of parameters to generate a reconstruction image 716 (reconstruction $\hat{x}_i$).

Figure 11:
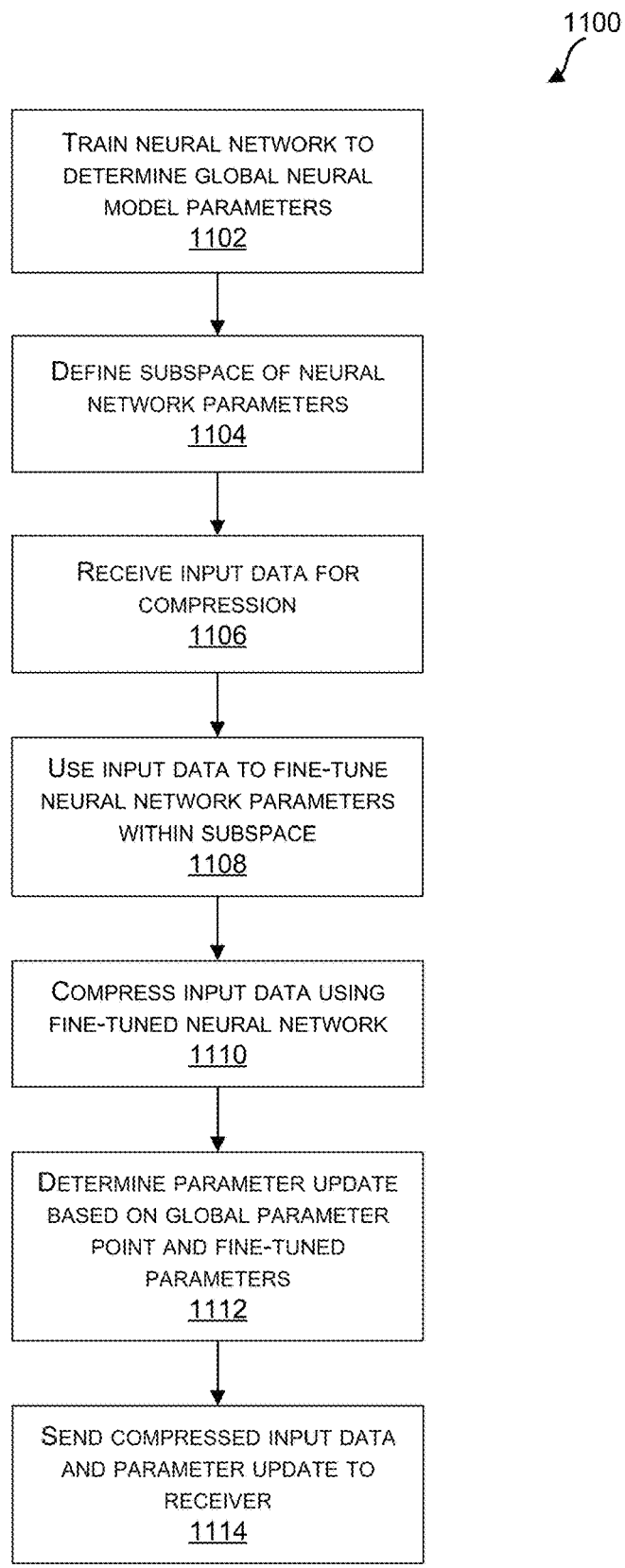
FIG. 11 is a diagram illustrating an example process for performing instance-adaptive neural compression, in accordance with some examples of the present disclosure.

FIG. 11 is a diagram illustrating an example process 1100 for performing instance-adaptive neural compression. At block 1102, the process 1100 can include training a neural network to determine global model parameters. For example, neural network compression system 700 can be trained using training data 702 to determine global model parameters (e.g., network weights) that can be included as part of shared knowledge 706.

At block 1104, the process 1100 can include defining a subspace of neural network parameters. In some aspects, the subspace can be based on weight vectors that were implemented during the training phase. For example, training parameter points 804 can be used to define a subspace 806. In some cases, principal component analysis (PCA) and/or sparse PCA can be used to determine the subspace. For instance, PCA can be used to determine one or more directions and/or trajectories in the full parameter space in which model parameters performed well during training of the neural network.

At block 1106, the process 1100 can include receiving input data for compression by the neural network compression system. For example, input data 708 (e.g., image data, video data, audio data) can be received by decoder 714. At block 1108, the process 1100 can include using the input data to fine-tune the neural network parameters within the subspace. In some aspects, the encoder 710 can use one or more weight vectors within the subspace to determine a modified set of parameters (e.g., fine-tuned parameters). In some examples, the modified set of parameters can be selected based on the performance of the encoder as measured by a loss function (e.g., rate and/or distortion).

At block 1110, the process 1100 can include compressing the input data using the fine-tuned neural network (e.g., using modified set of parameters from within the subspace). At block 1112, the process 1100 can include determining a parameter update based on the global parameter point and the fine-tuned parameters. Referring to FIG. 9, the parameter update 906 can be determined based on a shift from global parameters 904 to the fine-tuned parameters 908 within subspace 902.

At block 1114, the process 1100 can include sending compressed input data and the parameter update to a receiver. For example, encoder 710 can send compressed latent variables and compressed subspace coordinates to decoder 714. In some examples, an arithmetic encoder (e.g., arithmetic encoder 608) can entropy-code the compressed subspace coordinates and/or the compressed latent variables and generate one or more bitstreams (e.g., bitstream 712).

Figure 12:
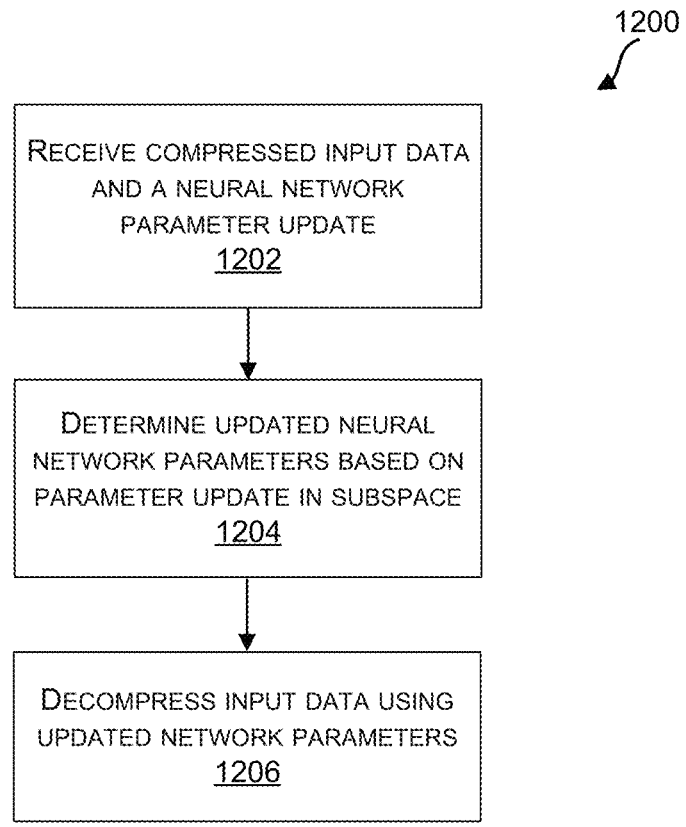
FIG. 12 is a flowchart illustrating an example of a process for performing instance-adaptive neural decompression, in accordance with some examples of the present disclosure.

FIG. 12 is a diagram illustrating an example process 1200 for performing instance-adaptive neural decompression. At block 1202, the process 1200 can include receiving compressed input data and a neural network parameter update. For example, decoder 714 can receive bitstream 712 that can include compressed latent variables and compressed subspace coordinates.

At block 1204, the process 1200 can include determining updated neural network parameters based on the parameter update in the subspace. In some aspects, decoder 714 can determine the updated neural network parameters (e.g., fine-tuned parameters used to encode the input data) by applying the parameter update (e.g., subspace coordinates) to the global model parameters. For example, network update 906 can be used to determine updated neural network parameters 908 by shifting global model parameters 904 within subspace 902.

At block 1206, the process 1200 can include decompressing the input data using the updated network parameters. For example, updated neural network parameters 908 can be used to decompress the compressed latent variables corresponding to input data 708. In some aspects, decoder 714 can use the updated network parameters to generate a reconstruction image 716.

Figure 13:
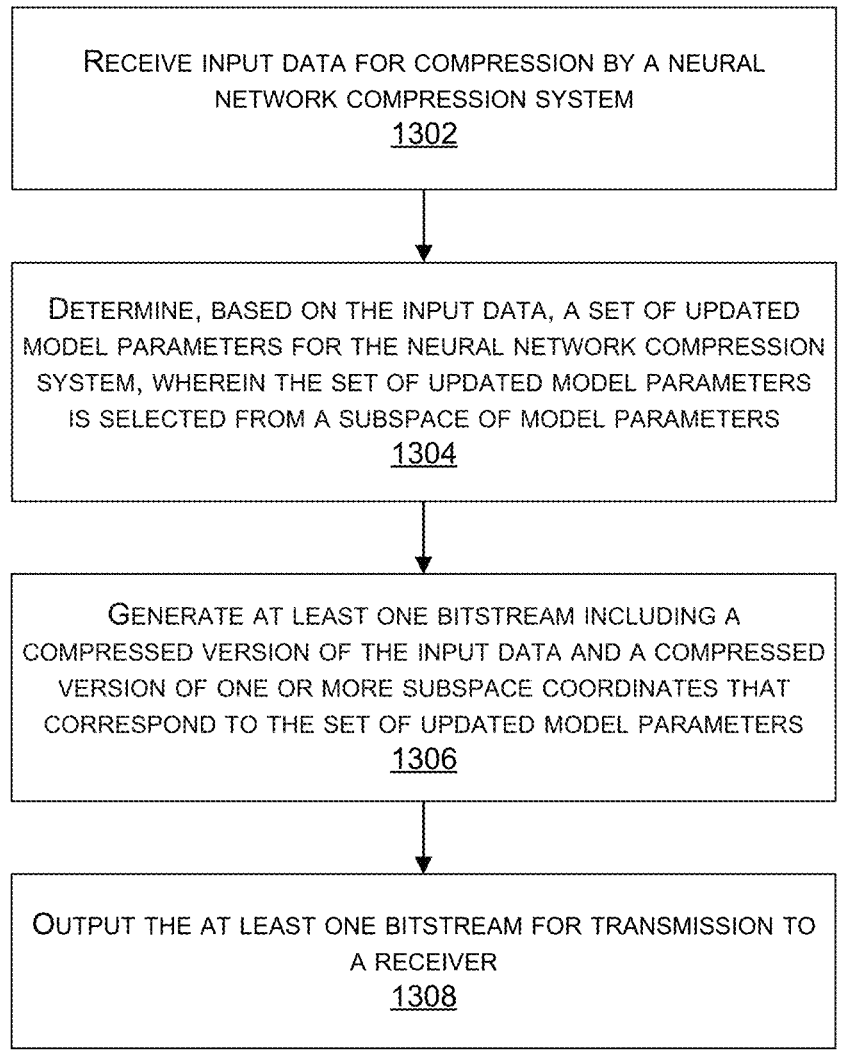
FIG. 13 is a flowchart illustrating another example of a process for performing instance-adaptive neural compression, in accordance with some examples of the present disclosure.

FIG. 13 is a diagram illustrating an example process 1300 for performing instance-adaptive neural compression. At block 1302, the process 1300 can include receiving input data for compression by a neural network compression system. In some aspects, the neural network compression system can correspond to neural network compression system 600 and/or neural network compression system 700. In some cases, the input data can include image data, video data, and/or audio data (e.g., input data 708).

At block 1304, the process 1300 can include determining, based on the input data, a set of updated model parameters for the neural network compression system, wherein the set of updated model parameters is selected from a subspace of model parameters. In some examples, the subspace of model parameters includes a portion of a plurality of weight vectors. For example, the subspace of model parameters 806 can include a portion of the training parameter points 804 (e.g., weight vectors). In some aspects, each of the plurality of weight vectors can correspond to a weight vector used during training of the neural network compression system. For instance, each of the training parameters points 804 can correspond to a weight vector (e.g., set of training parameters) used or visited during network training 704.

In some cases, the portion of the plurality of weight vectors can be determined using at least one of principal component analysis (PCA), sparse principal component analysis (SPCA), and model-agnostic meta-learning (MAML). For example, PCA can be used to process the training parameter points 804 to determine the subspace 806. In some cases, SPCA can be used to reduce the size of the subspace 806 by keeping components having the largest absolute value and setting all other components (e.g., in subspace matrix M) to zero. In some aspects, the portion of the plurality of weight vectors can be determined using a MAML algorithm according to the operations of process 1000.

In some examples, the process 1300 can include generating a set of global model parameters based on a training dataset used to train the neural network compression system, wherein the one or more subspace coordinates that correspond to the set of updated model parameters are relative to the set of global model parameters. In some cases, the training dataset may correspond to training data 702. In some cases, training data 702 can be used to perform network training 704 and determine optimal parameter point 802 (e.g., set of global model parameters). In some examples, updated parameter point 908 is relative to global parameter point 904 (e.g., based on subspace matrix 902 and subspace update 906).

In some examples, the process 1300 can include tuning the set of global model parameters using the input data, wherein the set of global model parameters are tuned based on a bit size of the compressed version of the input data and a distortion between the input data and the reconstructed data generated from the compressed version of the input data. In some aspects, the set of global model parameters can correspond to global parameter point 904 that can be tuned based on input 708. For example, encoder 710 can iteratively encode input data 708 using sets of parameters that are part of the subspace (e.g., subspace 902). In some examples, tuning the set of global parameters 904 can include selecting a modified set of parameters 908 based on a loss function (e.g., loss function in Equation (2)).

At block 1306, the process 1300 can include generating at least one bitstream including a compressed version of the input data and a compressed version of one or more subspace coordinates that correspond to the set of updated model parameters. For example, an arithmetic encoder (e.g., arithmetic encoder 608) can be used to entropy-code the compressed model update (e.g., subspace update 906) and the compressed latent variables into bitstream 712. In some cases, the at least one bitstream may include a plurality of encoded quantization parameters used for quantizing the one or more subspace coordinates. For instance, bitstream 712 may include quantization parameters used to quantize subspace update 906. In some aspects, generating the at least one bitstream can include entropy encoding the one or more subspace coordinates using a model prior. For example, model prior 616 can be used by arithmetic encoder 608 to entropy-code the one or more subspace coordinates (e.g., subspace update 906).

At block 1308, the process 1300 can include outputting the at least one bitstream for transmission to a receiver. For example, bitstream 712 can be outputted for transmission to decoder 714. In some examples, the process 1300 can include sending the subspace of model parameters to the receiver. For example, the subspace 808 can be encoded as part of bitstream 712 and sent to decoder 714.

Figure 14:
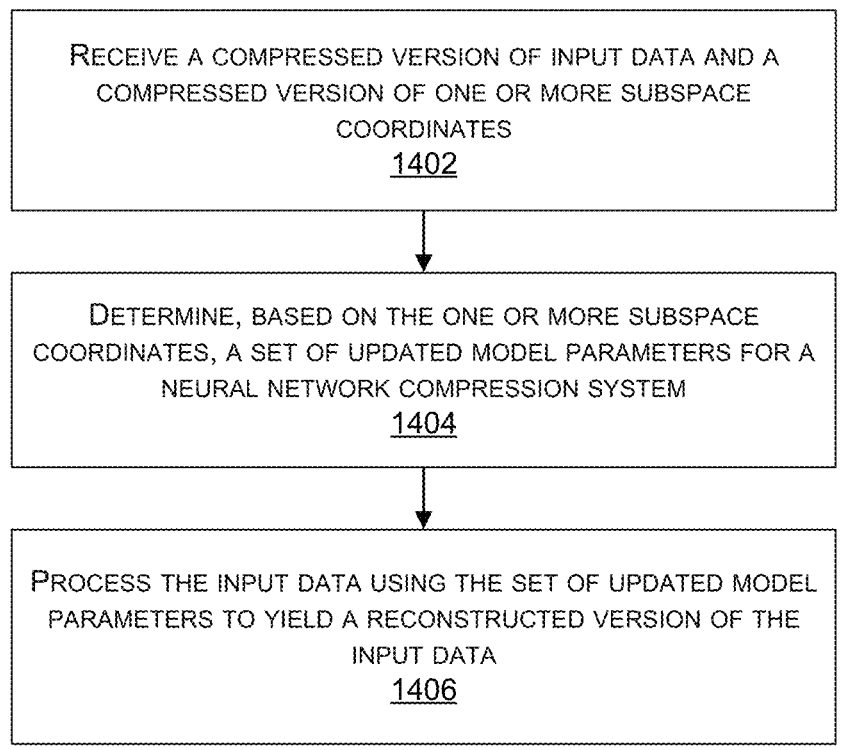
FIG. 14 is a flowchart illustrating another example of a process for performing instance-adaptive neural decompression, in accordance with some examples of the present disclosure.

FIG. 14 is a diagram illustrating an example process 1400 for performing instance-adaptive neural decompression. At block 1402, the process 1400 can include receiving a compressed version of input data and a compressed version of one or more subspace coordinates. For example, decoder 714 can receive bitstream 712 that can include a compressed version of input 708 and a compressed version of model update 906.

At block 1404, the process 1400 can include determining, based on the one or more subspace coordinates, a set of updated model parameters for a neural network compression system. For example, the set of updated model parameters can correspond to updated parameter point 908 that is determined based on subspace updated 906. In some aspects, determining the set of updated model parameters can include determining, based on a subspace of model parameters and the one or more subspace coordinates, a shift from a set of global model parameters. In some examples, the set of updated model parameters can correspond to updated parameter point 908 which can be equivalent to the global parameter point 904+(subspace matrix 902*subspace update 906).

In some aspects, the subspace of model parameters can include a portion of a plurality of weight vectors, wherein each of the plurality of weight vectors correspond to a weight vector used during training of the neural network compression system. For example, subspace 806 can include a portion of training parameter points 804 that can correspond to the training parameter points used during training of neural network compression system 700.

At block 1406, the process 1400 can include processing the input data using the set of updated model parameters to yield a reconstructed version of the input data. For instance, input data 708 (e.g., compressed in bitstream 712) can be processed using updated parameter point 908 to yield a reconstructed image 716.

In some examples, the process 1400 can include receiving the subspace of model parameters. For example, subspace 902 can be encoded as part of bitstream 712 and sent to decoder 714.

In some examples, the processes described herein (e.g., process 1000, process 1100, process 1200, process 1300, process 1400, and/or other process described herein) may be performed by a computing device or apparatus. In one example, the process 1300 and/or 1400 can be performed by the transmitting device 410 of the system 400 illustrated in FIG. 4. In another example, the process 1300 and/or 1400 can be performed by a computing device according to the system 400 shown in FIG. 4 or the computing system 1500 shown in FIG. 15.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100, the process 1200, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1300 and 1400 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1300, 1400, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
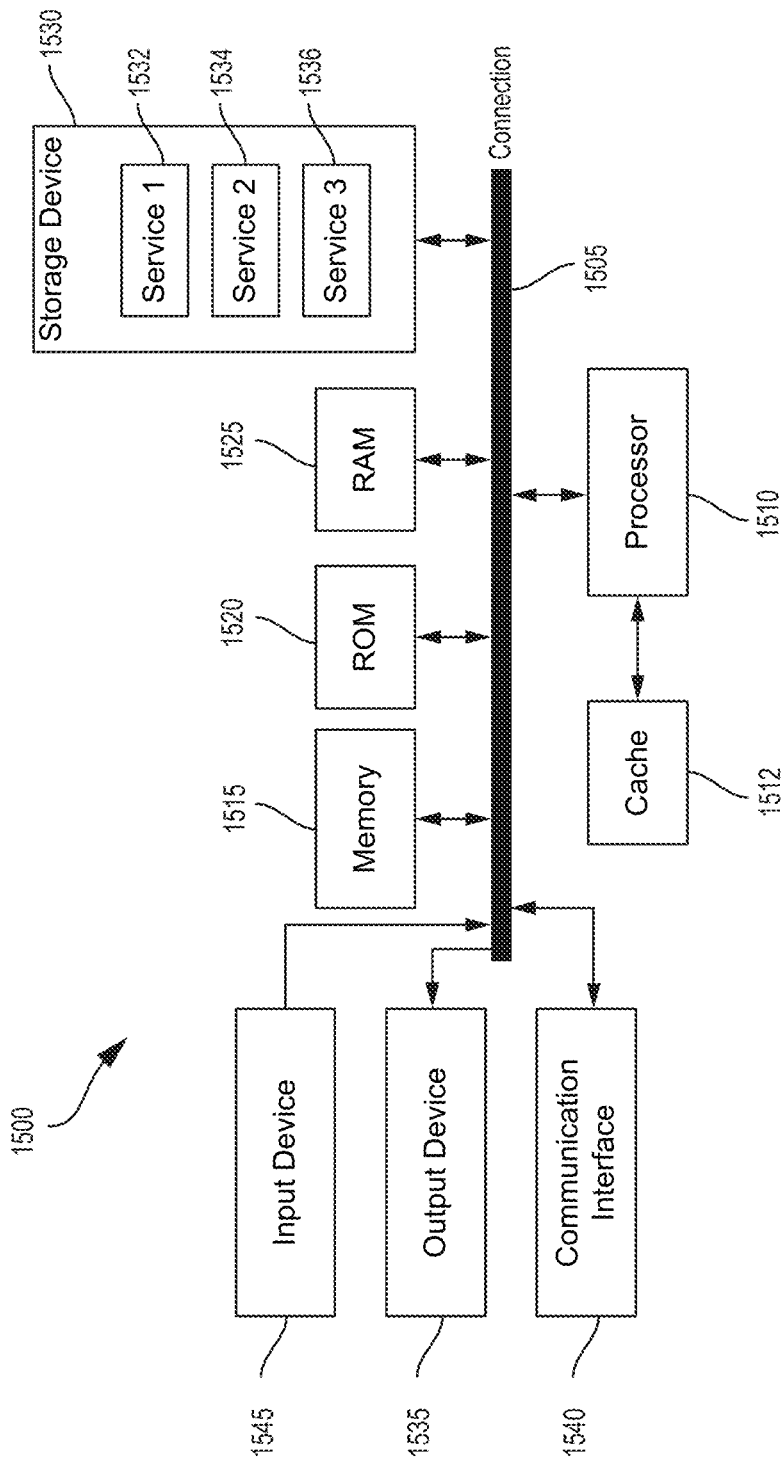
FIG. 15 illustrates an example computing system, in accordance with some examples of the present disclosure.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising at least one memory and at least one processor coupled to the at least one memory. The at least one processor is configured to: receive input data for compression by a neural network compression system; determine, based on the input data, a set of updated model parameters for the neural network compression system, wherein the set of updated model parameters is selected from a subspace of model parameters; generate at least one bitstream including a compressed version of the input data and a compressed version of one or more subspace coordinates that correspond to the set of updated model parameters; and output the at least one bitstream for transmission to a receiver.

Aspect 2: The apparatus according to aspect 1, wherein the subspace of model parameters includes a portion of a plurality of weight vectors.

Aspect 3: The apparatus according to aspect 2, wherein each of the plurality of weight vectors correspond to a weight vector used during training of the neural network compression system.

Aspect 4: The apparatus according to any one of aspects 2 to 3, wherein the portion of the plurality of weight vectors is determined using at least one of principal component analysis (PCA), sparse principal component analysis (SPCA), and model-agnostic meta-learning (MAML).

Aspect 5: The apparatus according to any one of aspects 1 to 4, wherein the at least one processor is further configured to: generate a set of global model parameters based on a training dataset used to train the neural network compression system, wherein the one or more subspace coordinates that correspond to the set of updated model parameters are relative to the set of global model parameters.

Aspect 6: The apparatus according to aspect 5, wherein to determine the set of updated model parameters from the subspace of model parameters the at least one processor is further configured to: tune the set of global model parameters using the input data, wherein the set of global model parameters are tuned based on a bit size of the compressed version of the input data and a distortion between the input data and reconstructed data generated from the compressed version of the input data.

Aspect 7: The apparatus according to any one of aspects 1 to 6, wherein the at least one processor is further configured to: quantize the one or more subspace coordinates to yield one or more quantized subspace coordinates, wherein the at least one bitstream comprises a compressed version of the one or more quantized subspace coordinates.

Aspect 8: The apparatus according to aspect 7, wherein the at least one bitstream comprises a plurality of encoded quantization parameters used for quantizing the one or more subspace coordinates.

Aspect 9: The apparatus according to any one of aspects 1 to 8, wherein to generate the at least one bitstream the at least one processor is further configured to: entropy encode the one or more subspace coordinates using a model prior.

Aspect 10: The apparatus according to any one of aspects 1 to 9, wherein the at least one processor is further configured to: send the subspace of model parameters to the receiver.

Aspect 11: A method of performing any of the operations of aspects 1 to 10.

Aspect 12: A computer-readable storage medium storing instructions that, when executed, cause one or more processors to perform any of the operations of aspects 1 to 10.

Aspect 13: An apparatus comprising means for performing any of the operations of aspects 1 to 10.

Aspect 14: An apparatus comprising at least one memory and at least one processor coupled to the at least one memory. The at least one processor is configured to: receive a compressed version of input data and a compressed version of one or more subspace coordinates; determine, based on the one or more subspace coordinates, a set of updated model parameters for a neural network compression system; and process the input data using the set of updated model parameters to yield a reconstructed version of the input data.

Aspect 15: The apparatus according to aspect 14, wherein to determine the set of updated model parameters the at least one processor is further configured to: determine, based on a subspace of model parameters and the one or more subspace coordinates, a shift from a set of global model parameters.

Aspect 16: The apparatus according to aspect 15, wherein the subspace of model parameters includes a portion of a plurality of weight vectors, wherein each of the plurality of weight vectors correspond to a weight vector used during training of the neural network compression system.

Aspect 17: The apparatus according to aspect 16, wherein the portion of the plurality of weight vectors is determined using principal component analysis (PCA).

Aspect 18: The apparatus according to any one of aspects 15 to 17, wherein the at least one processor is further configured to: receive the subspace of model parameters.

Aspect 19: A method of performing any of the operations of aspects 14 to 18.

Aspect 20: A computer-readable storage medium storing instructions that, when executed, cause one or more processors to perform any of the operations of aspects 14 to 18.

Aspect 21: An apparatus comprising means for performing any of the operations of aspects 14 to 18.

What is claimed is:

1. A method of processing image data, comprising:
receiving input data for compression by a neural network compression system;
determining, based on the input data, a set of updated model parameters for the neural network compression system, wherein the set of updated model parameters is selected from a subspace of model parameters based on minimizing, at inference time of a rate-distortion autoencoder (RD-AE) of the neural network compression system, a combined rate-distortion-model rate (RDM) loss corresponding to a rate-distortion loss of the RD-AE at the inference time and a number of model update bits used to represent the subspace of model parameters:
generating at least one bitstream including a compressed version of the input data and a compressed version of one or more subspace coordinates that correspond to the set of updated model parameters; and outputting the at least one bitstream for transmission to a receiver.

2. The method of claim 1, wherein the subspace of model parameters includes a portion of a plurality of weight vectors.

3. The method of claim 2, wherein each of the plurality of weight vectors correspond to a weight vector used during training of the neural network compression system.

4. The method of claim 2, wherein the portion of the plurality of weight vectors is determined using at least one of principal component analysis (PCA), sparse principal component analysis (SPCA), and model-agnostic meta-learning (MAML).

5. The method of claim 1, further comprising:
generating a set of global model parameters based on a training dataset used to train the neural network compression system, wherein the one or more subspace coordinates that correspond to the set of updated model parameters are relative to the set of global model parameters.

6. The method of claim 5, wherein determining the set of updated model parameters from the subspace of model parameters comprises:
tuning the set of global model parameters using the input data, wherein the set of global model parameters are tuned based on a bit size of the compressed version of the input data and a distortion between the input data and reconstructed data generated from the compressed version of the input data.

7. The method of claim 1, further comprising:
quantizing the one or more subspace coordinates to yield one or more quantized subspace coordinates, wherein the at least one bitstream comprises a compressed version of the one or more quantized subspace coordinates.

8. The method of claim 7, wherein the at least one bitstream comprises a plurality of encoded quantization parameters used for quantizing the one or more subspace coordinates.

9. The method of claim 1, wherein generating the at least one bitstream comprises:
entropy encoding the one or more subspace coordinates using a model prior.

10. The method of claim 1, further comprising:
sending the subspace of model parameters to the receiver.

11. An apparatus comprising:
at least one memory; and
at least one processor coupled to the at least one memory and configured to:
receive input data for compression by a neural network compression system;
determine, based on the input data, a set of updated model parameters for the neural network compression system, wherein the set of updated model parameters is selected from a subspace of model parameters based on minimizing, at inference time of a rate-distortion autoencoder (RD-AE) of the neural network compression system, a combined rate-distortion-model rate (RDM) loss corresponding to a rate-distortion loss of the RD-AE at the inference time and a number of model update bits used to represent the subspace of model parameters;
generate at least one bitstream including a compressed version of the input data and a compressed version of one or more subspace coordinates that correspond to the set of updated model parameters; and
output the at least one bitstream for transmission to a receiver.

12. The apparatus of claim 11, wherein the subspace of model parameters includes a portion of a plurality of weight vectors.

13. The apparatus of claim 12, wherein each of the plurality of weight vectors correspond to a weight vector used during training of the neural network compression system.

14. The apparatus of claim 12, wherein the portion of the plurality of weight vectors is determined using at least one of principal component analysis (PCA), sparse principal component analysis (SPCA), and model-agnostic meta-learning (MAML).

15. The apparatus of claim 11, where the at least one processor is further configured to:
generate a set of global model parameters based on a training dataset used to train the neural network compression system, wherein the one or more subspace coordinates that correspond to the set of updated model parameters are relative to the set of global model parameters.

16. The apparatus of claim 15, wherein to determine the set of updated model parameters from the subspace of model parameters the at least one processor is further configured to:
tune the set of global model parameters using the input data, wherein the set of global model parameters are tuned based on a bit size of the compressed version of the input data and a distortion between the input data and reconstructed data generated from the compressed version of the input data.

17. The apparatus of claim 11, where the at least one processor is further configured to:
quantize the one or more subspace coordinates to yield one or more quantized subspace coordinates, wherein the at least one bitstream comprises a compressed version of the one or more quantized subspace coordinates.

18. The apparatus of claim 17, wherein the at least one bitstream comprises a plurality of encoded quantization parameters used for quantizing the one or more subspace coordinates.

19. The apparatus of claim 11, wherein to generate the at least one bitstream the at least one processor is further configured to:
entropy encode the one or more subspace coordinates using a model prior.

20. The apparatus of claim 11, wherein the at least one processor is further configured to:
send the subspace of model parameters to the receiver.

21. A computer-readable storage medium storing instructions that, when executed by one or more processors, cause the one or more processors to:
receive input data for compression by a neural network compression system;
determine, based on the input data, a set of updated model parameters for the neural network compression system, wherein the set of updated model parameters is selected from a subspace of model parameters based on minimizing, at inference time of a rate-distortion autoencoder (RD-AE) of the neural network compression system, a combined rate-distortion-model rate (RDM) loss corresponding to a rate-distortion loss of the RD-AE at the inference time and a number of model update bits used to represent the subspace of model parameters;

generate at least one bitstream including a compressed version of the input data and a compressed version of one or more subspace coordinates that correspond to the set of updated model parameters; and output the at least one bitstream for transmission to a receiver.

22. The computer-readable storage medium of claim 21, wherein the subspace of model parameters includes a portion of a plurality of weight vectors.

23. The computer-readable storage medium of claim 22, wherein each of the plurality of weight vectors correspond to a weight vector used during training of the neural network compression system.

24. The computer-readable storage medium of claim 22, wherein the portion of the plurality of weight vectors is determined using at least one of principal component analysis (PCA), sparse principal component analysis (SPCA), and model-agnostic meta-learning (MAML).

25. The computer-readable storage medium of claim 21, wherein the instructions further cause the one or more processors to:

generate a set of global model parameters based on a training dataset used to train the neural network compression system, wherein the one or more subspace coordinates that correspond to the set of updated model parameters are relative to the set of global model parameters.

26. The computer-readable storage medium of claim 25, wherein to determine the set of updated model parameters from the subspace of model parameters, the instructions further cause the one or more processors to:

tune the set of global model parameters using the input data, wherein the set of global model parameters are tuned based on a bit size of the compressed version of the input data and a distortion between the input data and reconstructed data generated from the compressed version of the input data.

27. The computer-readable storage medium of claim 21, where the instructions further cause the one or more processors to:

quantize the one or more subspace coordinates to yield one or more quantized subspace coordinates, wherein the at least one bitstream comprises a compressed version of the one or more quantized subspace coordinates.

28. The computer-readable storage medium of claim 27, wherein the at least one bitstream comprises a plurality of encoded quantization parameters used for quantizing the one or more subspace coordinates.

29. The computer-readable storage medium of claim 21, wherein to generate the at least one bitstream, the instructions cause the one or more processors to:

entropy encode the one or more subspace coordinates using a model prior.

30. The computer-readable storage medium of claim 21, wherein the instructions cause the one or more processors to:

send the subspace of model parameters to the receiver.

* * * * *